(12) United States Patent
Kim et al.

(10) Patent No.: US 8,406,157 B2
(45) Date of Patent: Mar. 26, 2013

(54) COMMUNICATION METHOD FOR RADIO COMMUNICATION SYSTEM

(75) Inventors: Dong Cheol Kim, Seoul (KR); Min Seok Noh, Seoul (KR); Yeong Hyeon Kwon, Seoul (KR); Jin Sam Kwak, Seoul (KR); Sung Ho Moon, Seoul (KR); Seung Hee Han, Seoul (KR); Hyun Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 275 days.

(21) Appl. No.: 12/936,390

(22) PCT Filed: Apr. 14, 2009

(86) PCT No.: PCT/KR2009/001899
§ 371 (c)(1),
(2), (4) Date: Oct. 4, 2010

(87) PCT Pub. No.: WO2009/128632
PCT Pub. Date: Oct. 22, 2009

(65) Prior Publication Data
US 2011/0044215 A1 Feb. 24, 2011

Related U.S. Application Data

(60) Provisional application No. 61/044,890, filed on Apr. 14, 2008.

(51) Int. Cl.
*H04W 28/00* (2009.01)

(52) U.S. Cl. .................................... 370/280
(58) Field of Classification Search ............ None
See application file for complete search history.

(56) References Cited

U.S. PATENT DOCUMENTS

| 7,639,635 | B2* | 12/2009 | Anderson et al. | 370/280 |
| 7,986,681 | B2* | 7/2011 | Astely et al. | 370/341 |
| 2008/0144530 | A1* | 6/2008 | Che et al. | 370/254 |
| 2008/0304404 | A1* | 12/2008 | Lu et al. | 370/210 |
| 2009/0201838 | A1* | 8/2009 | Zhang et al. | 370/280 |
| 2009/0219839 | A1* | 9/2009 | Zhao et al. | 370/280 |
| 2009/0245222 | A1* | 10/2009 | Sampath et al. | 370/343 |
| 2010/0278083 | A1* | 11/2010 | Kwak et al. | 370/280 |

FOREIGN PATENT DOCUMENTS

| KR | 10-0547787 | 1/2006 |
| KR | 10-2006-0066877 | 6/2006 |

* cited by examiner

*Primary Examiner* — Min Jung
(74) *Attorney, Agent, or Firm* — Lee, Hong, Degerman, Kang & Waimey

(57) ABSTRACT

A communication method of a user equipment using a time division duplex (TDD) frame in a wireless communication system is provided. The communication method include configuring a TDD frame comprising at least one downlink subframe and at least one uplink subframe, and transmitting a signal by using the TDD frame, wherein an uplink of the TDD frame starts on the basis of a guard period (GP) or an uplink pilot time slot (UpPTS) of a heterogeneous TDD frame.

6 Claims, 16 Drawing Sheets

US 8,406,157 B2

COMMUNICATION METHOD FOR RADIO COMMUNICATION SYSTEM

CROSS-REFERENCE TO RELATED APPLICATIONS

This application is the National Stage filing under 35 U.S.C. 371 of International Application No. PCT/KR2009/001899, filed on Apr. 14, 2009, which claims the benefit of U.S. Provisional Application Ser. No. 61/044,890, filed on Apr. 14, 2008, the contents of which are all hereby incorporated by reference herein in their entirety.

BACKGROUND OF THE INVENTION

1. Field of the Invention

The present invention relates to wireless communications, and more particularly, to a communication method supporting heterogeneous systems.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4$^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system based on the 802.16e standard.

The IEEE 802.16m standard requires to guarantee coexistence of heterogeneous systems such as an IEEE 802.16e system, a time division synchronous code division multiple access (TD-SCDMA) system, and a long term evolution (LTE) system. There is a need to decrease interference between a system based on the IEEE 802.16m standard and the heterogeneous systems.

SUMMARY OF THE INVENTION

The present invention provides a time division duplexing (TDD) frame structure capable of decreasing interference between heterogeneous systems.

In an aspect, a communication method of a user equipment using a time division duplex (TDD) frame in a wireless communication system includes configuring a TDD frame comprising at least one downlink subframe and at least one uplink subframe, and transmitting a signal by using the TDD frame, wherein an uplink of the TDD frame starts on the basis of a guard period (GP) or an uplink pilot time slot (UpPTS) of a heterogeneous TDD frame. When a downlink part is greater than an uplink part, the uplink of the TDD frame may start on the basis of the GP, and when the UL part is greater than the downlink part, the uplink of the TDD frame may start on the basis of the UpPTS. A ratio of the downlink and the uplink may be determined based on a ratio of a downlink and an uplink of the heterogeneous TDD frame. An uplink orthogonal frequency division multiplexing access (OFDMA) symbol of the TDD frame overlapping with the downlink of the heterogeneous TDD frame may be punctured. The communication method may further include receiving information on the OFDMA symbols to be punctured. The heterogeneous TDD frame may be a TDD frame based on a low chip rate (LCR) standard or a TDD frame based on a long term evolution (LTE) standard.

DESCRIPTION OF EXEMPLARY EMBODIMENTS

Figure 1:
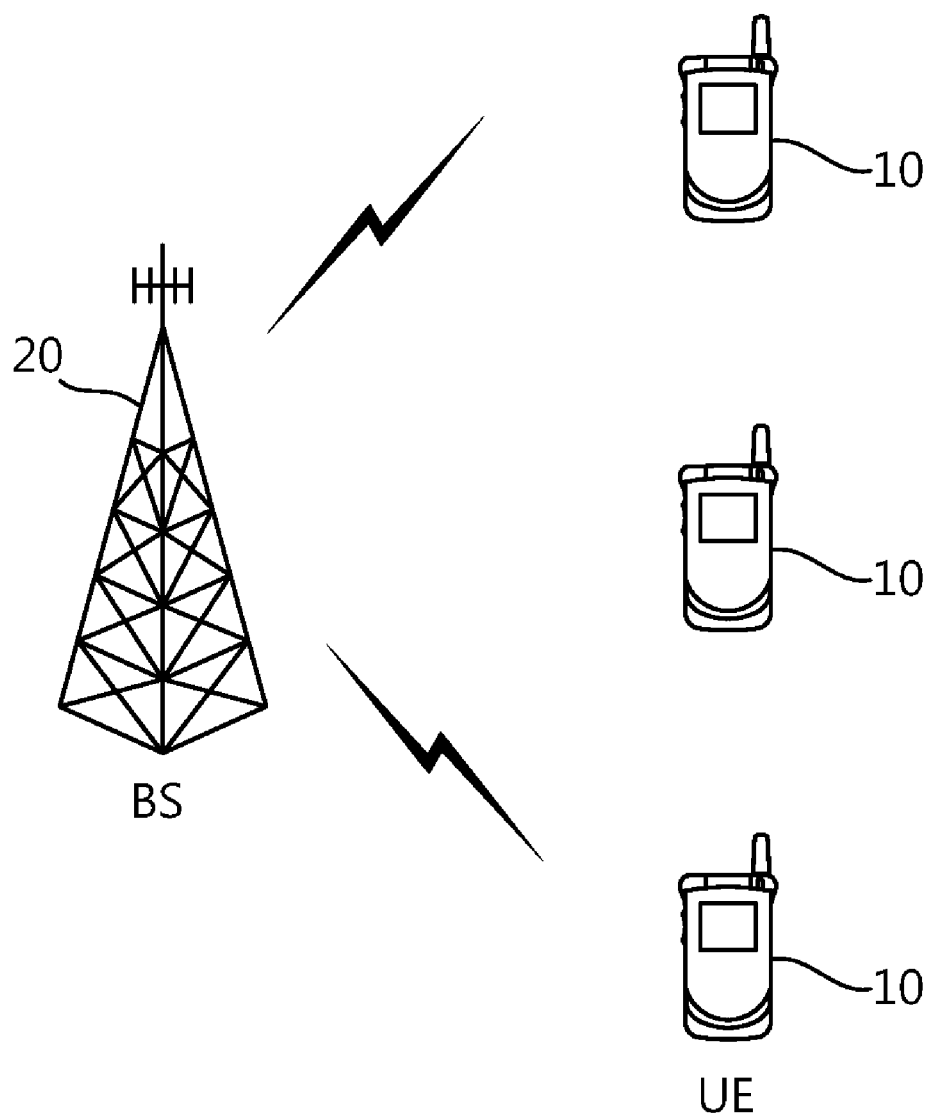
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the DE 10, and the receiver may be a part of the BS 20.

type subframe includes 7 OFDMA symbols. The first-type subframe and the second-type subframe may include an idle symbol. Time division duplexing (TDD), frequency division duplexing (FDD), and half-FDD (H-FDD) may be used in a frame. In a TDD system, each frame may include 2 switching points, but the present invention is not limited thereto. The switching point may imply switching from UL to DL or switching from DL to UL. The SFH may be located in a first DL subframe of the superframe, or may include a broadcast channel.

TABLE 1

| | | Channel bandwidth, B(MHz) | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling Frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, Tb(us) | | | 91.4 | 128 | 102.4 | 91.4 | 91.4 |
| CP ratio, G = 1/8 | | OFDMA symbol time, Ts(us) | 102.857 | 144 | 115.2 | 102.857 | 102.857 |
| | FDD | # of OFDMA symbols per 5 ms frame | 48 | 34 | 43 | 48 | 48 |
| | | Idle Time(us) | 62.857 | 104 | 46.40 | 62.857 | 62.857 |
| | TDD | # of OFDMA symbols per 5 ms frame | 47 | 33 | 42 | 47 | 47 |
| | | TTG + RTG(us) | 165.714 | 248 | 161.6 | 165.714 | 165.714 |
| CP ratio, O = 1/16 | | OFDMA symbol time, Ts(us) | 97.143 | 136 | 108.8 | 97.143 | 97.143 |
| | FDD | # of OFDMA symbols per 5 ms frame | 51 | 36 | 45 | 51 | 51 |
| | | Idle Time(us) | 45.71 | 104 | 104 | 45.71 | 45.71 |
| | TDD | # of OFDMA symbols per 5 ms frame | 50 | 35 | 44 | 50 | 50 |
| | | TTG + RTG(us) | 142.853 | 240 | 212.8 | 142.853 | 142.853 |

There is no restriction on the multiple access scheme applied to the wireless communication system. The multiple access scheme can be various such as code division multiple access (CDMA), time division multiple access (TDMA), frequency division multiple access (FDMA), single-carrier FDMA (SC-FDMA), and orthogonal frequency division multiple access (OFDMA).

The BS 20 has at least one cell. The cell is an area in which the BS 20 provides a communication service. Different communication mechanisms can be used in one cell. That is, heterogeneous wireless communication systems can exist by sharing a communication service area. Hereinafter, heterogeneous wireless communication systems or heterogeneous systems denote systems using different communication mechanisms. For example, the heterogeneous systems may be systems using different access schemes or may be a legacy system and an evolution system supporting backward compatibility with the legacy system. The heterogeneous system may denote a system based on a low chip rate (LCR) standard and a system based on an institute of electrical and electronics engineers (IEEE) 802.16m system or may be a system based on a long term evolution (LTE) standard and a system based on the IEEE 802.16m standard.

Figure 2:
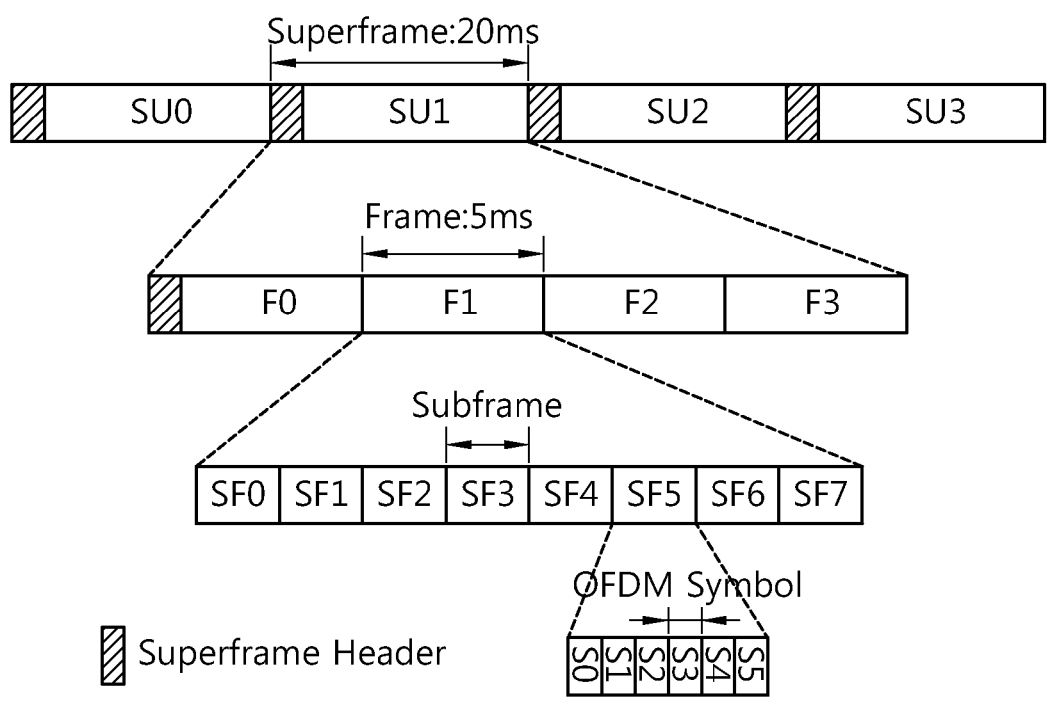
FIG. 2 shows an example of s frame structure based on the IEEE 802.16m standard.

FIG. 2 shows an example of s frame structure based on the IEEE 802.16m standard.

Referring to FIG. 2, a superframe includes a superframe header (SFH) and four frames F0, F1, F2, and F3. Although it is shown that each superframe has a size of 20 milliseconds (ms) and each frame has a size of 5 ms, the present invention is not limited thereto. When using OFDMA parameters of Table 1 below, each frame includes 8 subframes SF0, SF1, SF2, SF3, SF4, SF5, SF6, and SF7. Each subframe can be used for UL or DL transmission. The subframe is classified into two types according to a cyclic prefix (CP) size. A first-type subframe includes 6 OFDMA symbols, and a second- FIG. 3 shows an example of a TDD frame structure based on the IEEE 802.16m standard.

Figure 3:
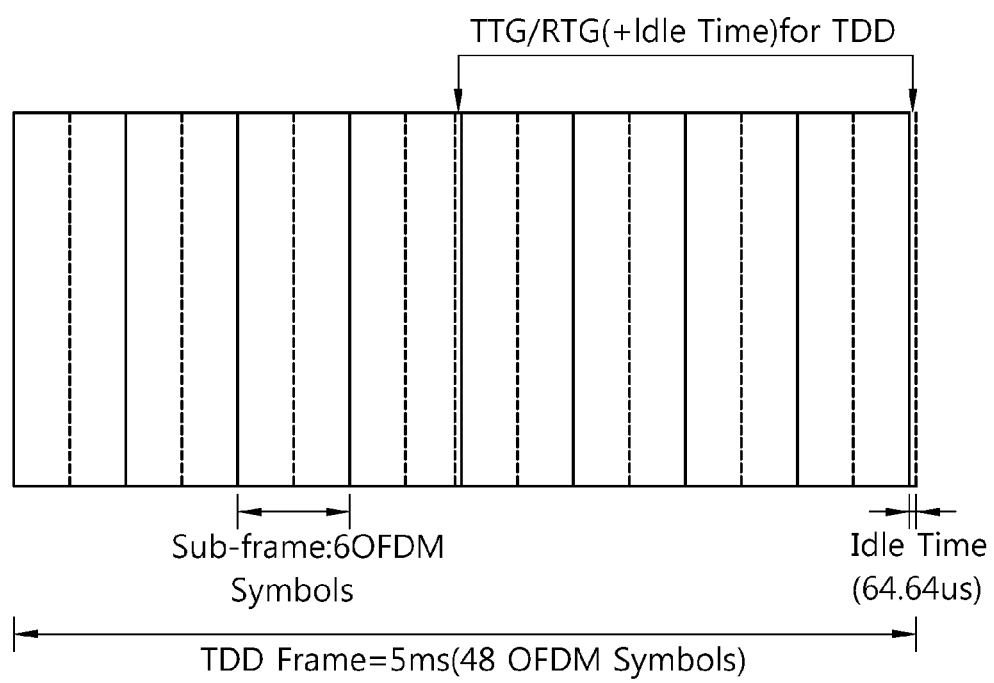
FIG. 3 shows an example of a TDD frame structure based on the IEEE 802.16m standard.

Referring to FIG. 3, when a channel bandwidth is 5, 10, or 20 MHz, a ratio of a downlink and an uplink may be one of 8:0, 7:1, 6:2, 5:3, 4:4, and 3:5. A TTG and an RTG may be inserted between a DL duration and a UL duration in each frame or to an end of each frame. When one subframe has 6 OFDMA symbols, one frame has 48 OFDMA symbols in total and has an idle time of 64.64 μs. Hereinafter, it is assumed that a CP length of the TDD frame based on the IEEE 802.16m standard is ⅛ Tb.

To minimize interference between heterogeneous systems, DL/UL alignment is necessary between TDD frames supporting each system. When the DL/UL alignment is performed on a DL region of TDD frames supporting heterogeneous systems, an OFDMA symbol to be punctured in the DL region, i.e., an idle time, may be required. In general, a DL part may be greater than a UL part. In this case, when a part of the DL region is punctured, a radio resource cannot be effectively used, and system performance deteriorates.

Hereinafter, a TDD frame structure for decreasing interference between heterogeneous systems will be described.

First, a TDD frame supporting a system based on a low chip rate (LCR) standard (hereinafter, an LCR TDD frame) and a TDD frame supporting a system based on an IEEE 802.16m standard (hereinafter, an IEEE 802.16m TDD frame) will be described. Herein, the LCR TDD frame may also be referred to as a heterogeneous frame or a heterogeneous TDD frame.

Figure 4:
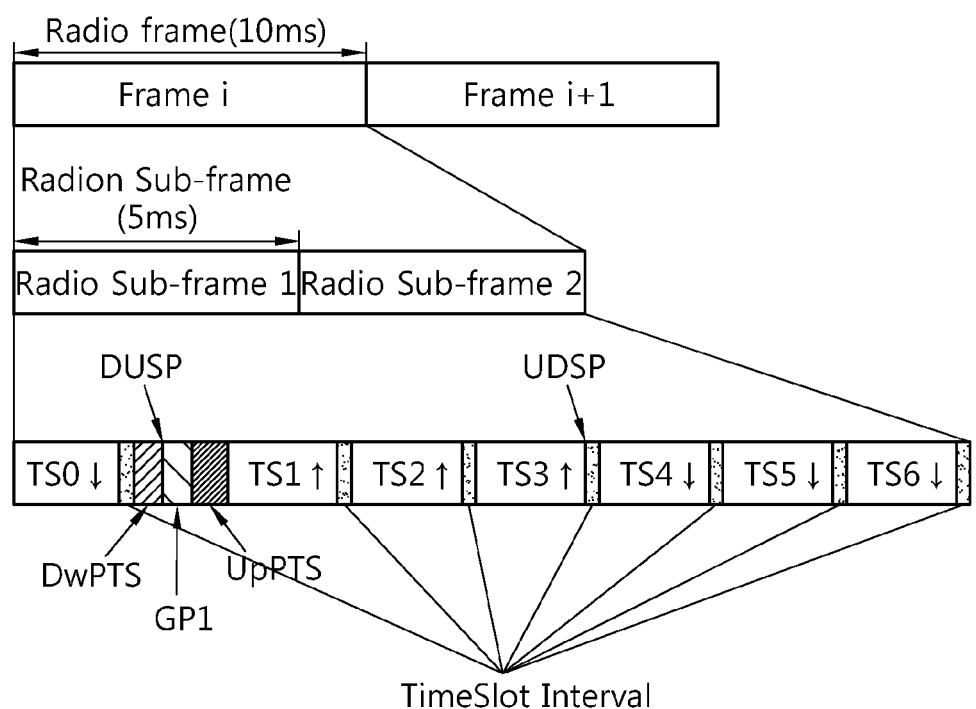
FIG. 4 shows an example of an LCR TDD frame (1.28 Mcps) structure.

FIG. 4 shows an example of an LCR TDD frame (1.28 Mcps) structure. In this example, a ratio of a downlink and an uplink (hereinafter, a DL/UL ratio) is 4:3. In addition thereto, the DL/UL ratio may be 6:1, 5:2, etc.

Referring to FIG. 4, one radio frame consists of two radio subframes. Each radio frame has a size of 10 ms. Each radio subframe has a size of 5 ms. One radio subframe consists of 7 traffic slots (TSs). Each traffic slot has a size of 0.675 ms. Between a TS0 and a TS1, a downlink pilot time slot (DwPTS), a guard period (GP), and an uplink pilot time slot (UpPTS) exist. The DwPTS has a length of 75 μs. The GP has a length of 75 μs. The UpPTS has a length of 125 μs. The DwPTS and the UpTPS are used for DL synchronization and UL synchronization. A symbol ↓ denotes a DL traffic slot, and a symbol ↑ denotes a UL traffic slot. Between the TS0 and the TS1, a downlink to uplink switching point (DUSP) exists. Between a TS3 and a TS4, an uplink to downlink switching point (USDP) exists.

Table 2 shows an LCR TDD frame structure and an IEEE 802.16m TDD frame structure having coexistence with the LCR TDD frame structure.

TABLE 2

| 4:3 | LCR | D | DwPTS | GP | UpPTS | U | U | U | D | D | D |
|---|---|---|---|---|---|---|---|---|---|---|---|
| | 16 m(1) | | | | | U | | | | | |
| | 16 m(2) | | | | | | U | | | | |
| 5:2 | LCR | D | DwPTS | GP | UpPTS | U | U | D | D | D | D |
| | 16 m(1) | | | | | U | | | | | |
| | 16 m(2) | | | | | | U | | | | |
| 6:1 | LCR | D | DwPTS | GP | UpPTS | U | D | D | D | D | D |
| | 16 m(1) | | | | | U | | | | | |
| | 16 m(2) | | | | | | U | | | | |

Referring to Table 2, a DL/UL ratio of the LCR TDD frame may be 4:3, 5:2, or 6:1. To decrease interference between heterogeneous systems, an uplink of the IEEE 802.16m TDD frame may start on the basis of a GP or a UpPTS of the LCR TDD frame. That is, when the DL/UL ratio of the LCR TDD frame is 4:3, if the uplink of the IEEE 802.16m TDD frame starts on the basis of the GP of the LCR TDD frame, a maximum possible uplink length of the IEEE 802.16m TDD frame is GP+UpPTS+U+U+U, and if it starts on the basis of the UpPTS, the maximum possible uplink length thereof is UpPTS+U+U+U. When the DL/UL ratio of the LCR TDD frame is 5:2, if the uplink of the IEEE 802.16m TDD frame starts on the basis of the GP of the LCR TDD frame, the maximum possible uplink length of the IEEE 802.16m TDD frame is GP+UpPTS+U+U, and if it starts on the basis of the UpPTS, the maximum possible uplink length is UpPTS+U+U. When the DL/UL ratio of the LCR TDD frame is 6:1, if the uplink of the IEEE 802.16m TDD frame starts on the basis of the GP of the LCR TDD frame, the maximum possible uplink length of the IEEE 802.16m TDD frame is GP+UpPTS+U, and if it starts on the basis of the UpPTS, the maximum possible uplink length is UpPTS+U.

Therefore, the DL/UL ratio of the IEEE 802.16m TDD frame having coexistence with the LCR TDD frame can be determined based on the DL/UL ratio of the LCR TDD frame and on the basis of a start point of the uplink of the IEEE 802.16m TDD frame. Meanwhile, in the IEEE 802.16m TDD frame, DL and UL can be distinguished in a subframe unit. Therefore, some OFDMA symbols constituting a UL subframe of the IEEE 802.16m TDD frame may overlap with a DL duration of the LCR TDD frame.

Figure 5:
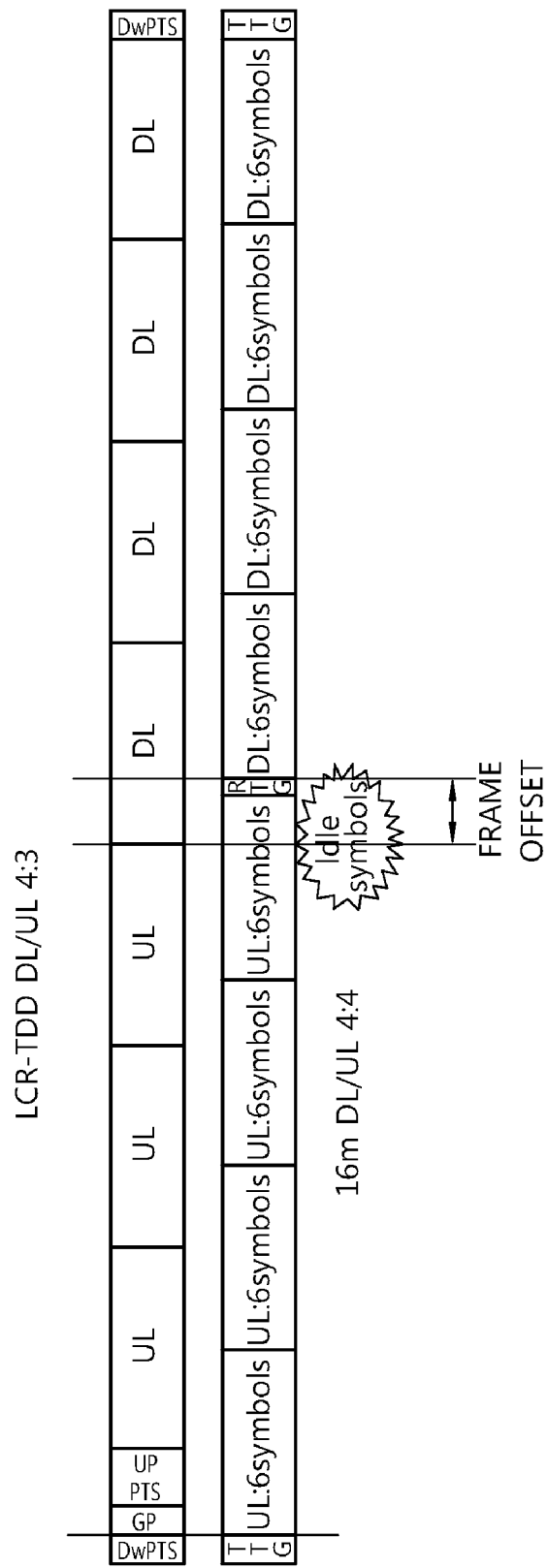
FIG. 5 shows an example of an IEEE 802.16m TDD frame in which an uplink starts on the basis of a GP of an LCR TDD frame.

FIG. 5 shows an example of an IEEE 802.16m TDD frame in which an uplink starts on the basis of a GP of an LCR TDD frame.

Referring to FIG. 5, since a DL/UL ratio of the LCR TDD frame is 4:3, a maximum possible uplink length of the IEEE 802.16m TDD frame is 222 μs (GP+UpPTS+U+U+U of the LCR TDD frame). Accordingly, the DL/UL ratio of the IEEE 802.16m TDD frame may be 4:4. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 3 OFDMA symbols.

Figure 6:
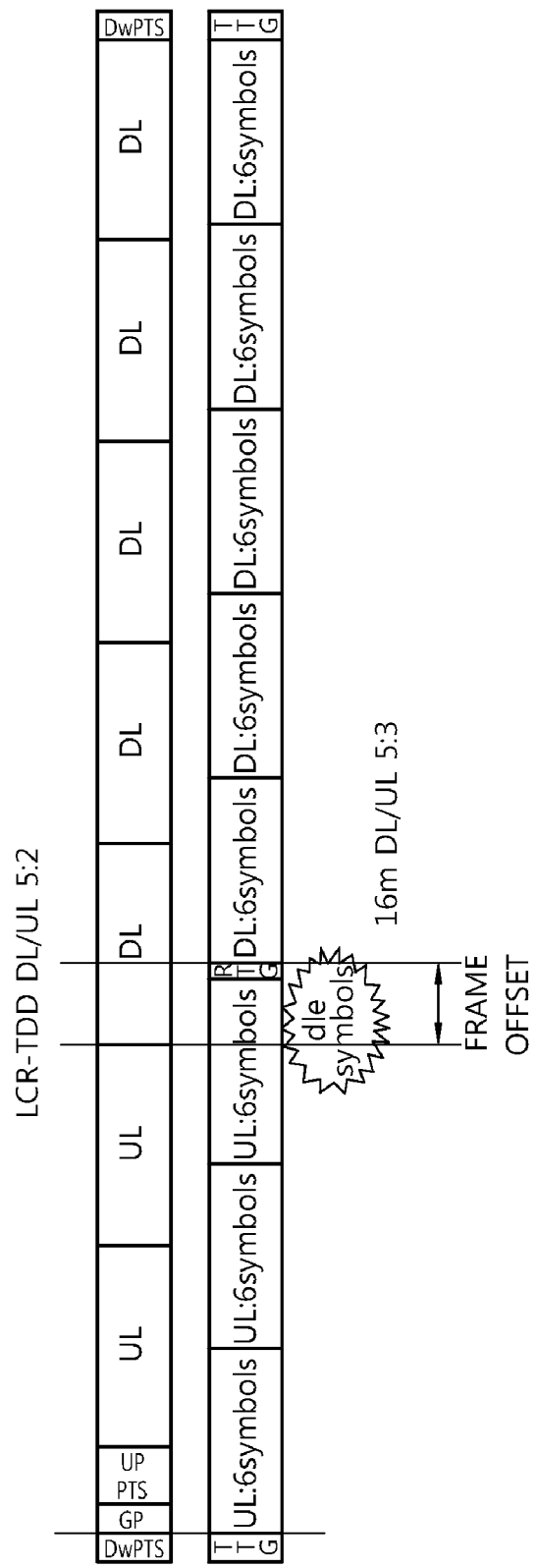
FIG. 6 shows another example of an IEEE 802.16m TDD frame in which an uplink starts on the basis of a GP of an LCR TDD frame.

FIG. 6 shows another example of an IEEE 802.16m TDD frame in which an uplink starts on the basis of a GP of an LCR TDD frame.

Referring to FIG. 6, since a DL/UL ratio of the LCR TDD frame is 5:2, a maximum possible uplink length of the IEEE 802.16m TDD frame is 1550 μs (GP+UpPTS+U+U of the LCR TDD frame). Accordingly, the DL/UL ratio of the IEEE 802.16m TDD frame may be 5:3. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 3 OFDMA symbols.

Figure 7:
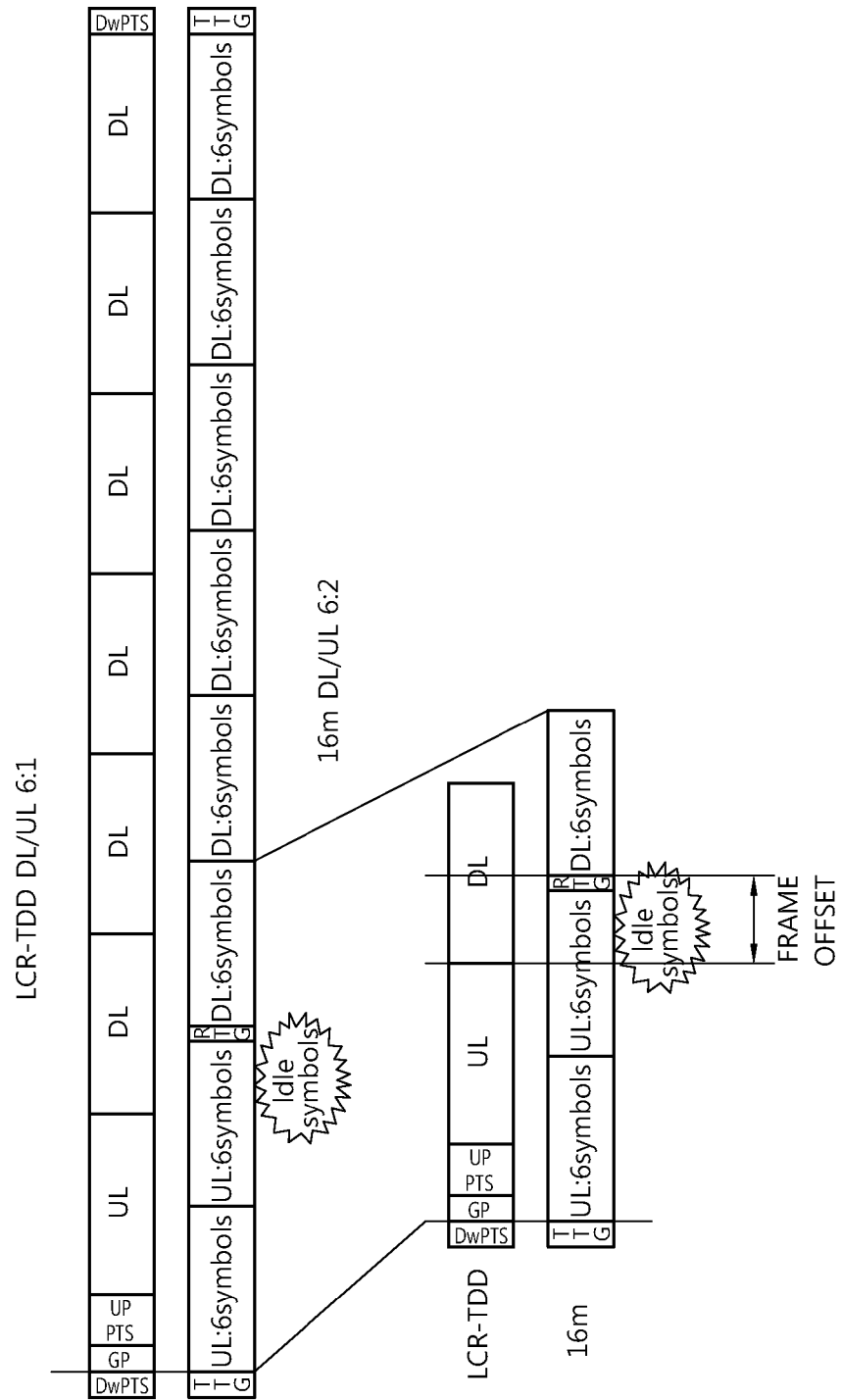
FIG. 7 shows another example of an IEEE 802.16m TDD frame in which an uplink starts on the basis of a GP of an LCR TDD frame.

FIG. 7 shows another example of an IEEE 802.16m TDD frame in which an uplink starts on the basis of a GP of an LCR TDD frame.

Referring to FIG. 7, since a DL/UL ratio of the LCR TDD frame is 6:1, a maximum possible uplink length of the IEEE 802.16m TDD frame is 875 μs (GP+UpPTS+U of the LCR TDD frame). Accordingly, the DL/UL ratio of the IEEE 802.16m TDD frame may be 6:2. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 4 OFDMA symbols.

Figure 8:
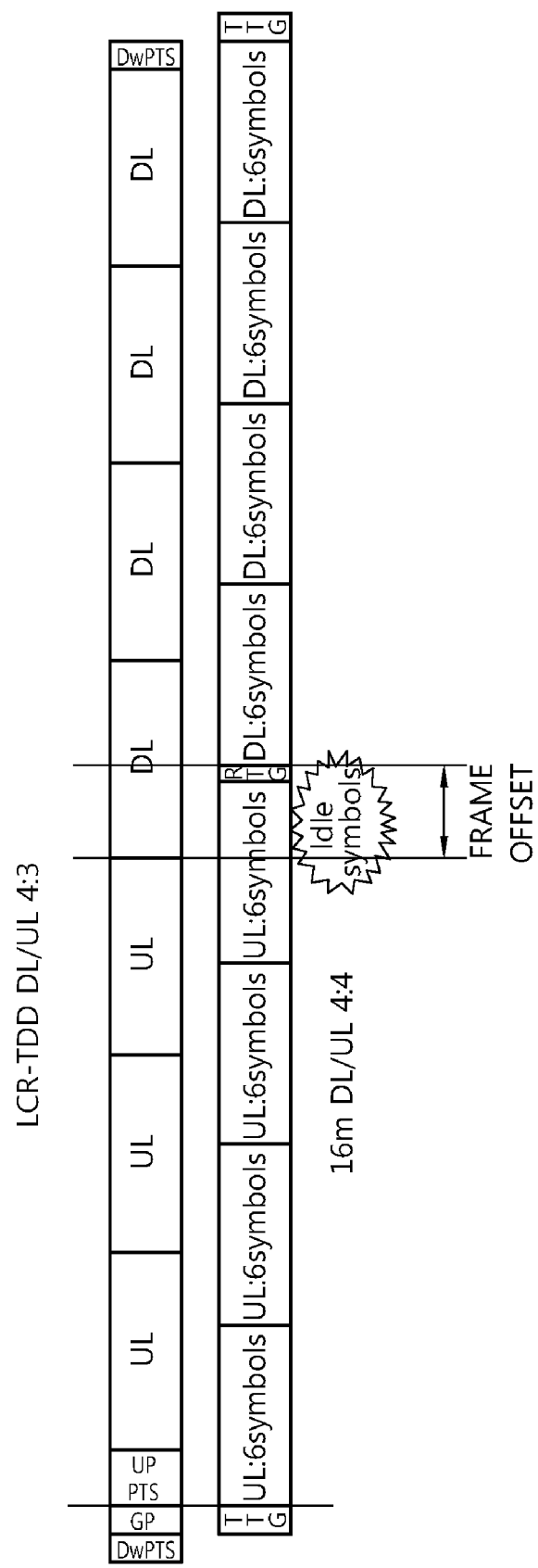
FIG. 8 shows another example of an IEEE 802.16m TDD frame in which an uplink starts on the basis of a UpPTS of an LCR TDD frame.

FIG. 8 shows another example of an IEEE 802.16m TDD frame in which an uplink starts on the basis of a UpPTS of an LCR TDD frame.

Referring to FIG. 8, since a DL/UL ratio of the LCR TDD frame is 4:3, a maximum possible uplink length of the IEEE 802.16m TDD frame is 215 μs (UpPTS+U+U+U of the LCR TDD frame). Accordingly, the DL/UL ratio of the IEEE 802.16m TDD frame may be 4:4. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 4 OFDMA symbols.

Figure 9:
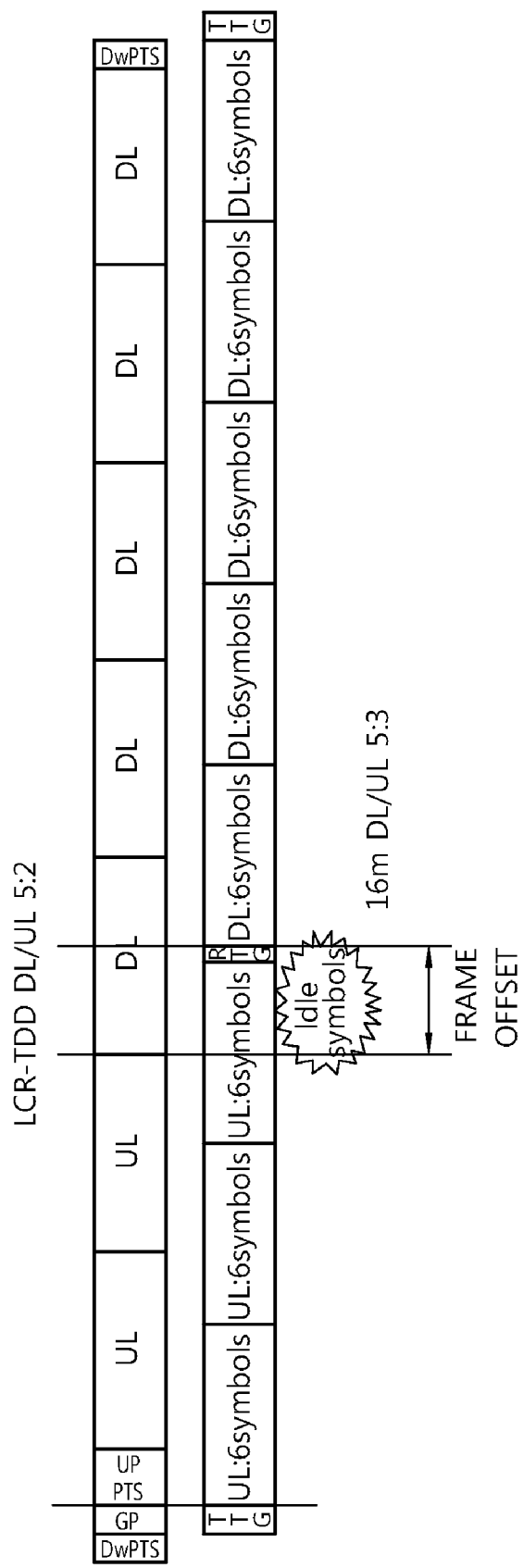
FIG. 9 shows another example of an IEEE 802.16m TDD frame in which an uplink starts on the basis of a UpPTS of an LCR TDD frame.

FIG. 9 shows another example of an IEEE 802.16m TDD frame in which an uplink starts on the basis of a UpPTS of an LCR TDD frame.

Referring to FIG. 9, since a DL/UL ratio of the LCR TDD frame is 5:2, a maximum possible uplink length of the IEEE 802.16m TDD frame is 1475 μs (UpPTS+U+U of the LCR TDD frame). Accordingly, the DL/UL ratio of the IEEE 802.16m TDD frame may be 5:3. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 4 OFDMA symbols.

Figure 10:
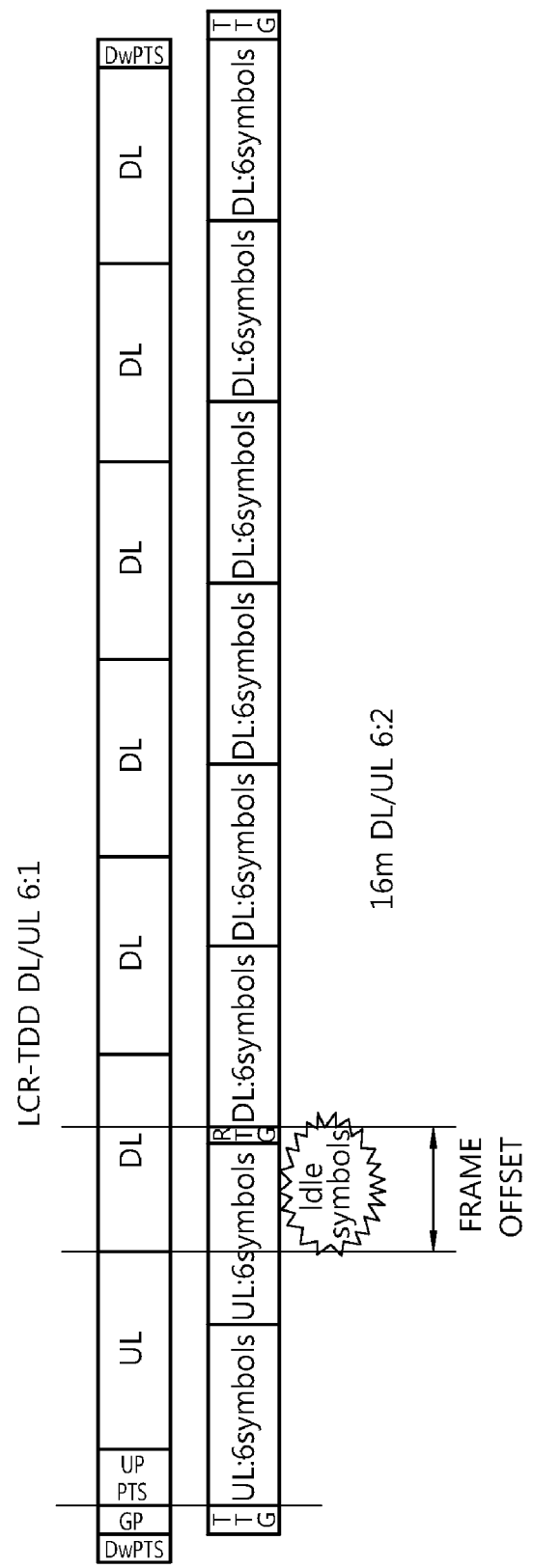
FIG. 10 shows another example of an IEEE 802.16m TDD frame in which an uplink starts on the basis of a UpPTS of an LCR TDD frame.

FIG. 10 shows another example of an IEEE 802.16m TDD frame in which an uplink starts on the basis of a UpPTS of an LCR TDD frame.

Referring to FIG. 10, since a DL/UL ratio of the LCR TDD frame is 6:1, a maximum possible uplink length of the IEEE 802.16m TDD frame is 800 μs (UpPTS+U of the LCR TDD frame). Accordingly, the DL/UL ratio of the IEEE 802.16m TDD frame may be 6:2. However, an uplink of the IEEE 802.16m TDD frame partially overlaps with a downlink of the LCR TDD frame. To decrease interference between heterogeneous systems, a part overlapping with the downlink of the LCR TDD frame can be punctured. An idle time to be punctured corresponds to 5 OFDMA symbols.

Table 3 shows a result obtained when the uplink of the IEEE 802.16m TDD frame starts on the basis of the GP of the LCR TDD frame as shown in FIG. 5 to FIG. 7. Table 4 shows a result obtained when the uplink of the IEEE 802.16m TDD frame starts on the basis of the UpPTS of the LCR TDD frame as shown in FIG. 8 to FIG. 10.

TABLE 3

| DL/UL | DwPTS | GP | UpPTS | UL in TD-SCDMA with GP + UpPTS | TD UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 4:3 | 75 | 75 | 125 | 2225 | 3.61 | 1912.51 | 2018.22 | 4 | 4 | false | false | 3 |
| 5:2 | 75 | 75 | 125 | 1550 | 2.51 | 1295.59 | 1401.3 | 3 | 5 | false | false | 3 |
| 6:1 | 75 | 75 | 125 | 875 | 1.42 | 678.67 | 784.38 | 2 | 6 | false | false | 4 |

TABLE 4

| DL/UL | DwPTS | GP | UpPTS | UL in TD-SCDMA with GP + UpPTS | TD UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 4:3 | 75 | 75 | 125 | 2150 | 3.49 | 1912.51 | 2018.22 | 4 | 4 | false | false | 4 |
| 5:2 | 75 | 75 | 125 | 1475 | 2.39 | 1295.59 | 1401.3 | 3 | 5 | false | false | 4 |
| 6:1 | 75 | 75 | 125 | 800 | 1.30 | 678.67 | 784.38 | 2 | 6 | false | false | 5 |

Table 3 and Table 4 show a DL/UL ratio of the IEEE 802.16m TDD frame suitable for a DL/UL ratio of an LCR TDD frame and the number of OFDMA symbols to be punctured. The DL/UL ratio of the IEEE 802.16m TDD frame is a DL/UL ratio that minimizes the number of OFDMA symbols to be punctured. Referring to Table 3 and Table 4, for all DL/UL ratios of the LCR TDD frame, the number of OFDMA symbols to be punctured is smaller when the uplink of the IEEE 802.16m TDD frame starts on the basis of the GP of the LCR TDD frame in comparison with the case where it starts on the basis of the UpPTS.

Therefore, the uplink of the IEEE 802.16m TDD frame having coexistence with the LCR TDD frame may start on the basis of the GP or the UpPTS of the LCR TDD frame. In particular, when the uplink of the IEEE 802.16m TDD frame starts on the basis of the GP of the LCR TDD frame, the number of OFDMA symbols to be punctured can be decreased. Accordingly, a radio resource can be further effectively used.

Next, a TDD frame supporting a system based on the LTE standard (hereinafter, an LTE TDD frame) and an IEEE 802.16m TDD frame having coexistence with the LTE TDD frame will be described. Herein, the LTE TDD frame may also be referred to as a heterogeneous frame or a heterogeneous TDD frame.

Figure 11:
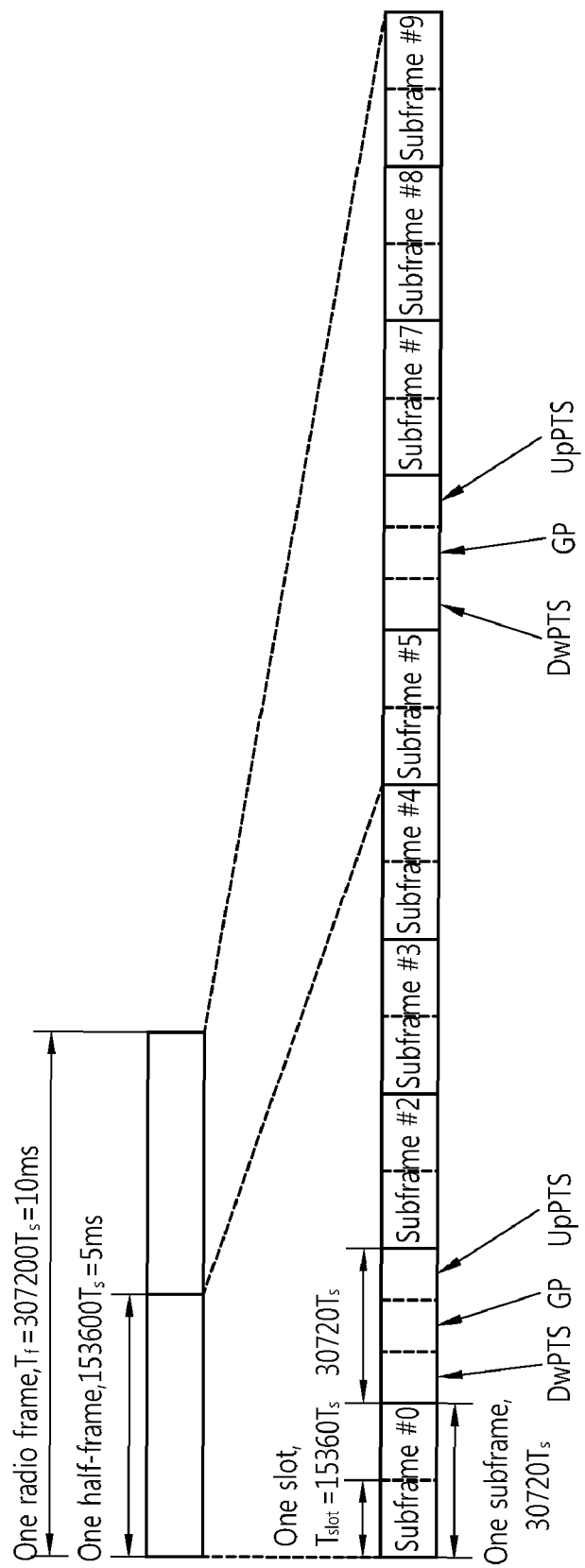
FIG. 11 shows an example of an LTE TDD frame structure.

FIG. 11 shows an example of an LTE TDD frame structure.

Referring to FIG. 11, each radio frame consists of 2 half frames. Each half frame consists of 5 subframes. If each radio frame has a length of 10 ms, each half frame has a length of 5 ms and each subframe has a length of 1 ms. A DL to UL switching point exists periodically in every 5 ms or 10 ms.

Table 5 shows DL and UL assignment in a TDD frame exemplified in FIG. 11. Only a case where a switching point periodicity is 5 ms is described herein for example.

TABLE 5

| configuration | Switch point periodicity | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

Referring to FIG. 5, D denotes a subframe designated for DL transmission, U denotes a subframe designated for UL transmission, and S denotes a special subframe having a DwPTS, a GP, and a UpPTS. If a DL to UL switching point periodicity is 5 ms, the special subframe exists in every half frame.

Table 6 shows a special subframe in a TDD frame exemplified in FIG. 11.

TABLE 6

| | Normal Cyclic Prefix | | | Extended Cyclic Prefix | | |
|---|---|---|---|---|---|---|
| configuration | DwPTS | GP | UpPTS | DwPTS | GP | UpPTS |
| 0 | 6592*Ts | 21936*Ts | 2192*Ts | 7680*Ts | 20480*Ts | 2560*Ts |
| 1 | 19760*Ts | 8768*Ts | | 20480*Ts | 7680*Ts | |
| 2 | 21952*Ts | 6576*Ts | | 23040*Ts | 5120*Ts | |

TABLE 6-continued

| | Normal Cyclic Prefix | | | Extended Cyclic Prefix | | |
|---|---|---|---|---|---|---|
| configuration | DwPTS | GP | UpPTS | DwPTS | GP | UpPTS |
| 3 | 24144*Ts | 4384*Ts | | 25600*Ts | 2560*Ts | |
| 4 | 26336*Ts | 2192*Ts | | 7680*Ts | 17920*Ts | |
| 5 | 6592*Ts | 19744*Ts | 4384*Ts | 20480*Ts | 5120*Ts | 5120*Ts |
| 6 | 19760*Ts | 6576*Ts | | 23040*Ts | 2560*Ts | |
| 7 | 21952*Ts | 4384*Ts | | — | — | |
| 8 | 24144*Ts | 2192*Ts | | — | — | |

In Table 6, a DwPTS, a GP, and a UpPTS are included in a special frame and have a different length according to whether a cyclic prefix (CP) is a normal CP or an extended CP. In case of the normal CP, the special subframe having the DwPTS, the GP, and the UpPTS may have 9 configurations. In case of the extended CP, the special subframe having the DwPTS, the GP, and the UpPTS may have 7 configurations. First, a case where the LTE TDD frame is the normal CP will be described.

Table 7 shows an LTE TDD frame having a normal CP and a DL/UL ratio of 1:3 and an IEEE 802.16m TDD frame structure having coexistence with the LTE TDD frame.

TABLE 7

| configuration | Switch point periodicity | Subframe number | | | | | | | | | |
|---|---|---|---|---|---|---|---|---|---|---|---|
| | | 0 | 1 | | 2 | 3 | 4 | 5 | 6 | | 7 | 8 | 9 |
| 0 (DL/UL 1:3) | | D | S | | U | U | U | D | S | | U | U | U |
| | 5 ms | D | DwPTS | GP | UpPTS | U | U | U | D | DwPTS | GP | UpPTS | U | U | U |
| Normal | | | 214.58 | 714.06 | 71.35 | | | | | 214.58 | 714.06 | 71.35 | | | |
| CP, | | | 643.23 | 285.42 | 71.35 | | | | | 643.23 | 285.42 | 71.35 | | | |
| Switch | | | 714.58 | 214.06 | 71.35 | | | | | 714.58 | 214.06 | 71.35 | | | |
| point | | | 785.94 | 142.71 | 71.35 | | | | | 785.94 | 142.71 | 71.35 | | | |
| | | | 857.29 | 71.35 | 71.35 | | | | | 857.29 | 71.35 | 71.35 | | | |
| | | | 214.58 | 642.71 | 142.71 | | | | | 214.58 | 642.71 | 142.71 | | | |
| | | | 643.23 | 214.06 | 142.71 | | | | | 643.23 | 214.06 | 142.71 | | | |
| | | | 714.58 | 142.71 | 142.71 | | | | | 714.58 | 142.71 | 142.71 | | | |
| | | | 785.94 | 71.35 | 142.71 | | | | | 785.94 | 71.35 | 142.71 | | | |
| 16 m(1) | | | | | U | | | | | | | U | | | |
| 16 m(2) | | | | | | U | | | | | | | U | | |

Table 8 shows an LTE TDD frame having a normal CP and a DL/UL ratio of 2:2 and an IEEE 802.16m TDD frame structure having coexistence with the LTE TDD frame.

TABLE 8

| configuration | Switch point periodicity | Subframe number | | | | | | | | | |
|---|---|---|---|---|---|---|---|---|---|---|---|
| | | 0 | 1 | | 2 | 3 | 4 | 5 | 6 | | 7 | 8 | 9 |
| 1 (DL/UL 2:2) | | D | S | | U | U | D | D | S | | U | U | D |
| | 5 ms | D | DwPTS | GP | UpPTS | U | U | D | D | DwPTS | GP | UpPTS | U | U | D |
| Normal | | | 214.58 | 714.06 | 71.35 | | | | | 214.58 | 714.06 | 71.35 | | | |
| CP, | | | 643.23 | 285.42 | 71.35 | | | | | 643.23 | 285.42 | 71.35 | | | |
| Switch | | | 714.58 | 214.06 | 71.35 | | | | | 714.58 | 214.06 | 71.35 | | | |
| point | | | 785.94 | 142.71 | 71.35 | | | | | 785.94 | 142.71 | 71.35 | | | |
| | | | 857.29 | 71.35 | 71.35 | | | | | 857.29 | 71.35 | 71.35 | | | |
| | | | 214.58 | 642.71 | 142.71 | | | | | 214.58 | 642.71 | 142.71 | | | |
| | | | 643.23 | 214.06 | 142.71 | | | | | 643.23 | 214.06 | 142.71 | | | |
| | | | 714.58 | 142.71 | 142.71 | | | | | 714.58 | 142.71 | 142.71 | | | |
| | | | 785.94 | 71.35 | 142.71 | | | | | 785.94 | 71.35 | 142.71 | | | |
| 16 m(1) | | | | | U | | | | | | | U | | | |
| 16 m(2) | | | | | | U | | | | | | | U | | |

Table 9 shows an LTE TDD frame having a normal CP and a DL/UL ratio of 3:1 and an IEEE 802.16m TDD frame structure having coexistence with the LTE TDD frame.

TABLE 9

| configuration | Switch point periodicity | 0 | 1 (DwPTS / GP / UpPTS) | 2 | 3 | 4 | 5 | 6 (DwPTS / GP / UpPTS) | 7 | 8 | 9 |
|---|---|---|---|---|---|---|---|---|---|---|---|
| 2 (DL/UL 3:1) | | D | S | U | D | D | D | S | U | D | D |
| Normal CP, Switch point | 5 ms | D | DwPTS / GP / UpPTS | U | D | D | D | DwPTS / GP / UpPTS | U | D | D |
| | | | 214.58 / 714.06 / 71.35 | | | | | 214.58 / 714.06 / 71.35 | | | |
| | | | 643.23 / 285.42 / 71.35 | | | | | 643.23 / 285.42 / 71.35 | | | |
| | | | 714.58 / 214.06 / 71.35 | | | | | 714.58 / 214.06 / 71.35 | | | |
| | | | 785.94 / 142.71 / 71.35 | | | | | 785.94 / 142.71 / 71.35 | | | |
| | | | 857.29 / 71.35 / 71.35 | | | | | 857.29 / 71.35 / 71.35 | | | |
| | | | 214.58 / 642.71 / 142.71 | | | | | 214.58 / 642.71 / 142.71 | | | |
| | | | 643.23 / 214.06 / 142.71 | | | | | 643.23 / 214.06 / 142.71 | | | |
| | | | 714.58 / 142.71 / 142.71 | | | | | 714.58 / 142.71 / 142.71 | | | |
| | | | 785.94 / 71.35 / 142.71 | | | | | 785.94 / 71.35 / 142.71 | | | |
| 16 m(1) | | | | | | | U | | | | U |
| 16 m(2) | | | | | | | | U | | | U |

Referring to Table 7 to Table 9, the DL/UL ratio of the LTE TDD frame may be: 3, 2:2, or 3:1. To decrease interference between heterogeneous systems, an uplink of the IEEE 802.16m TDD frame may start on the basis of a GP or a UpPTS of the LTE TDD frame. That is, when the DL/UL ratio of the LTE TDD frame is 1:3, if the uplink of the IEEE 802.16m TDD frame starts on the basis of the GP of the LTE TDD frame, a maximum possible uplink length of the IEEE 802.16m TDD frame is GP+UpPTS+U+U+U, and if it starts on the basis of the UpPTS, the maximum possible uplink length thereof is UpPTS+U+U+U. When the DL/UL ratio of the LTE TDD frame is 5:2, if the uplink of the IEEE 802.16m TDD frame starts on the basis of the GP of the LTE TDD frame, the maximum possible uplink length of the IEEE 802.16m TDD frame is GP+UpPTS+U+U, and if it starts on the basis of the UpPTS, the maximum possible uplink length is UpPTS+U+U. When the DL/UL ratio of the LTE TDD frame is 3:1, if the uplink of the IEEE 802.16m TDD frame starts on the basis of the GP of the LTE TDD frame, the maximum possible uplink length of the IEEE 802.16m TDD frame is GP+UpPTS+U, and if it starts on the basis of the UpPTS, the maximum possible uplink length is UpPTS+U.

Therefore, the DL/UL ratio of the IEEE 802.16m TDD frame having coexistence with the LTE TDD frame can be determined based on the DL/UL ratio of the LTE TDD frame and a start point of the uplink of the IEEE 802.16m TDD frame.

Figure 12:
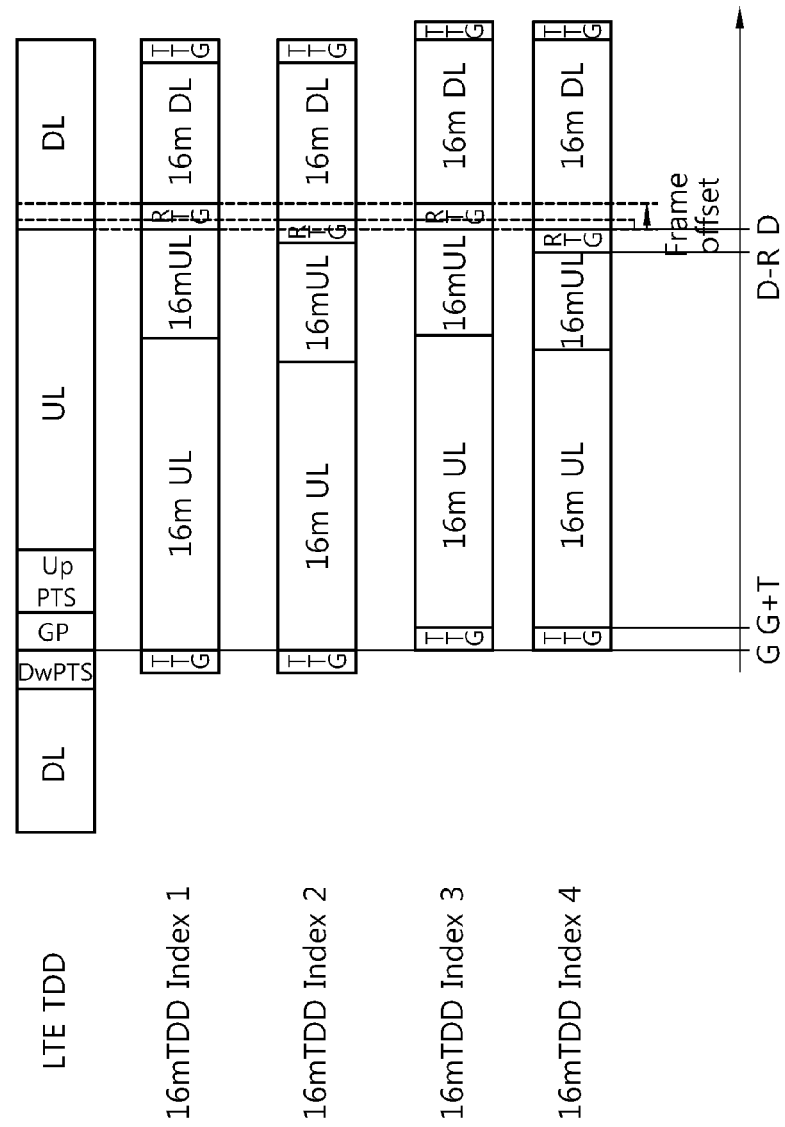
FIG. 12 shows an example of an IEEE 802.16m TDD frame in which an uplink starts on the basis of a GP of an LTE TDD frame.

FIG. 12 shows an example of an IEEE 802.16m TDD frame in which an uplink starts on the basis of a GP of an LTE TDD frame. It is assumed that there is no OFDMA symbol to be punctured. That is, a frame offset may be 0 or may have a value less than an RTG. The frame offset denotes a duration between a downlink start point of a heterogeneous TDD frame (e.g., an LCR TDD frame or an LTE TDD frame) and a downlink start point of the IEEE 802.16m TDD frame.

Referring to FIG. 12, a maximum possible length of an uplink of the IEEE 802.16m TDD frame may correspond to a duration from a GP of the LTE TDD frame to an end of the uplink. Coexistence with the LTE TDD frame can be achieved by using a TTG and an RTG which are located before and after the uplink of the IEEE 802.16m TDD frame. For example, the uplink of the 802.16m TDD frame may start from any point between a GP start point of the LTE TDD frame and a point G+T obtained by adding a TTG to the GP start point. The uplink of the 802.16m TDD frame may end at any point between a point D-R obtained by subtracting an RTG from a DL start point of the LTE TDD frame and a DL start point D. An index 1 is an IEEE 802.16m TDD frame having a maximum uplink. An index 4 is an IEEE 802.16m TDD frame having a minimum uplink. An index 2 is an IEEE 802.16m TDD frame having any uplink between the maximum uplink and the minimum uplink. As such, if the uplink of the IEEE 802.16m TDD frame is less than the uplink of the LTE TDD frame, the TTG and the RTG can be properly arranged before and after the IEEE 802.16m TDD frame. Accordingly, overlapping of the uplink duration of the IEEE 802.16m TDD frame and the downlink duration of the LTE TDD frame can be avoided, and interference between systems can be minimized.

Figure 13:
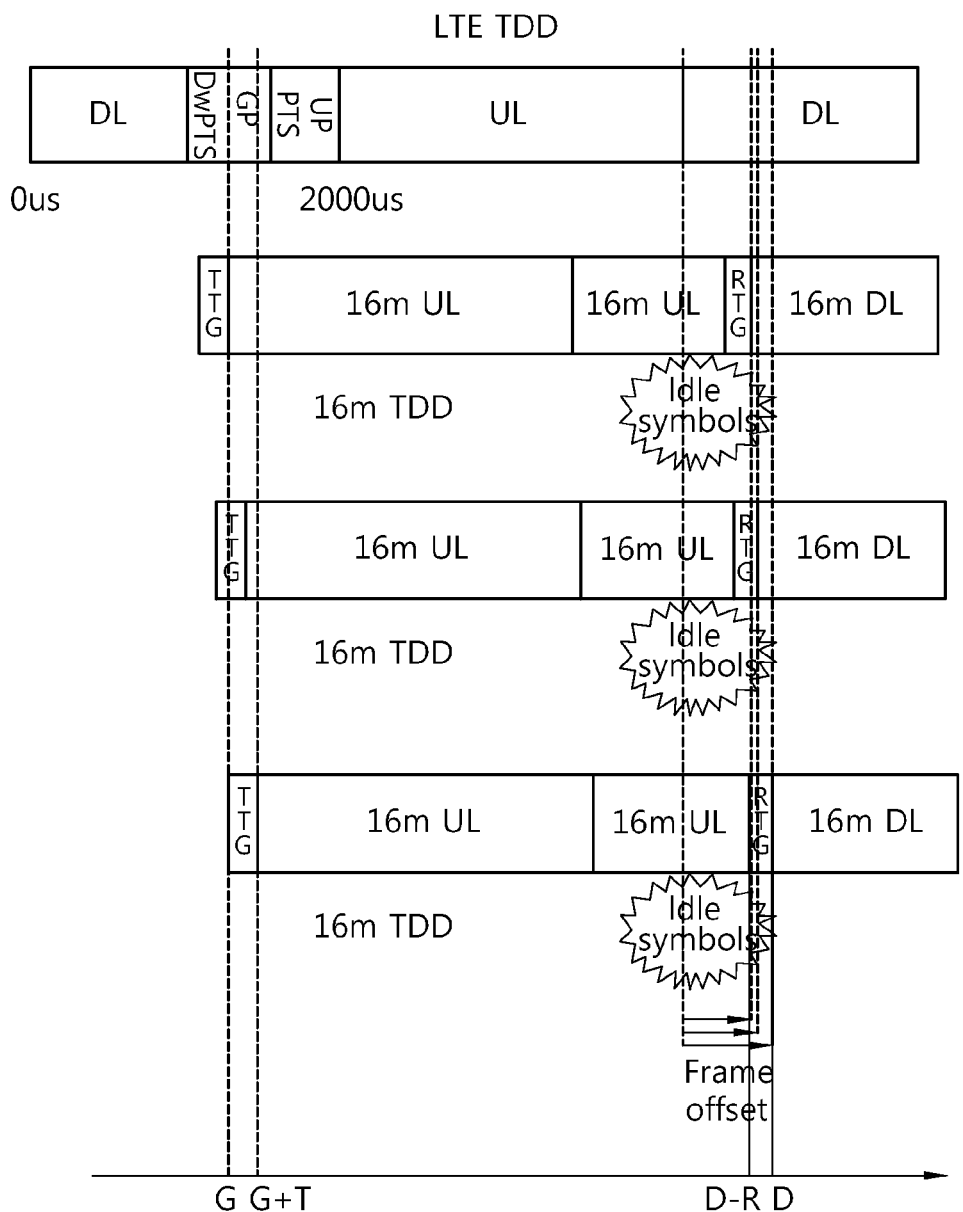
FIG. 13 shows another example of an IEEE 802.16m TDD frame in which an uplink starts on the basis of a GP of an LTE TDD frame.

FIG. 13 shows another example of an IEEE 802.16m TDD frame in which an uplink starts on the basis of a GP of an LTE TDD frame.

Referring to FIG. 13, the uplink of the 802.16m TDD frame may start from any point between a GP start point G of the LTE TDD frame and a point G+T obtained by adding a TTG to the GP start point. A DL/UL ratio of the IEEE 802.16m TDD frame is determined based on a DL/UL ratio of the LTE TDD frame, and DL and UL can be distinguished in a sub-frame unit, Therefore, some OFDMA symbols constituting a UL subframe of the IEEE 802.16m TDD frame may overlap with DL of the LTE TDD frame. In this case, to decrease interference between heterogeneous systems, a part overlapping with a downlink of the LTE TDD frame may be performed, and UL transmission may not be performed during a punctured idle time duration.

Figure 14:
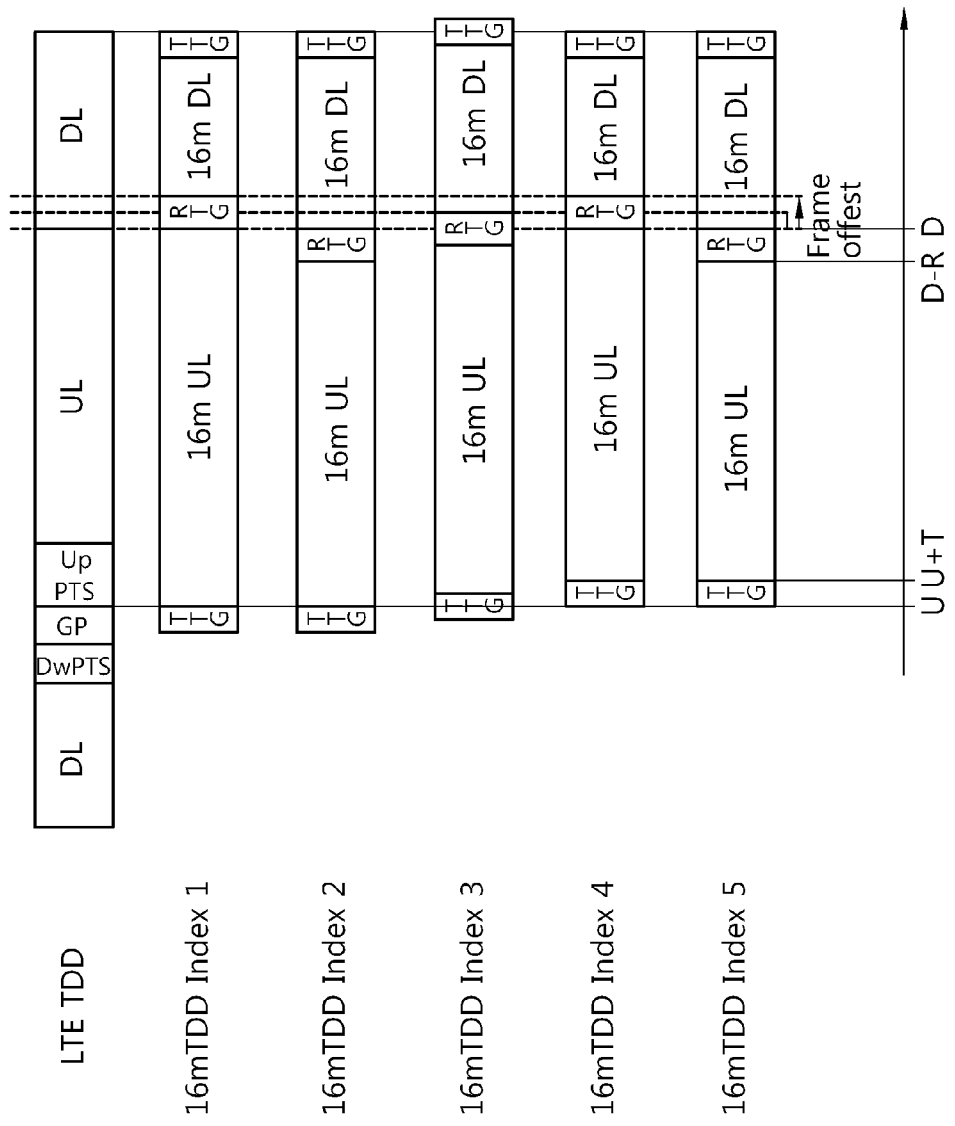
FIG. 14 shows an example of an IEEE 802.16m TDD frame in which an uplink starts on the basis of a UpTPS of an LTE TDD frame.

FIG. 14 shows an example of an IEEE 802.16m TDD frame in which an uplink starts on the basis of a UpTPS of an LTE TDD frame. It is assumed that there is no OFDMA symbol to be punctured. That is, a frame offset may be 0 or may have a value less than an RTG.

Referring to FIG. 12, a maximum possible length of an uplink of the IEEE 802.16m TDD frame may correspond to a duration from a UpPTS of the LTE TDD frame to an end of the uplink. Coexistence with the LTE TDD frame can be achieved by using a TTG and an RTG which are located before and after the uplink of the IEEE 802.16m TDD frame. For example, the uplink of the 802.16m TDD frame may start from any point between a UpPTS start point of the LTE TDD frame and a point G+T obtained by adding a TTG to the UpPTS start point. The uplink of the 802.16m TDD frame may end at any point between a point D-R obtained by subtracting an RTG from a DL start point of the LTE TDD frame and a DL start point D. An index 1 is an IEEE 802.16m TDD frame having a maximum uplink. An index 5 is an IEEE 802.16m TDD frame having a minimum uplink. Indices 2 to 4 are IEEE 802.16m TDD frames having any uplink between the maximum uplink and the minimum uplink. As such, if the uplink of the IEEE 802.16m TDD frame is less than the uplink of the LTE TDD frame, the TTG and the RTG can be properly arranged before and after the IEEE 802.16m TDD frame. Accordingly, overlapping of the uplink duration of the IEEE 802.16m TDD frame and the downlink duration of the LTE TDD frame can be avoided, and interference between systems can be minimized.

Figure 15:
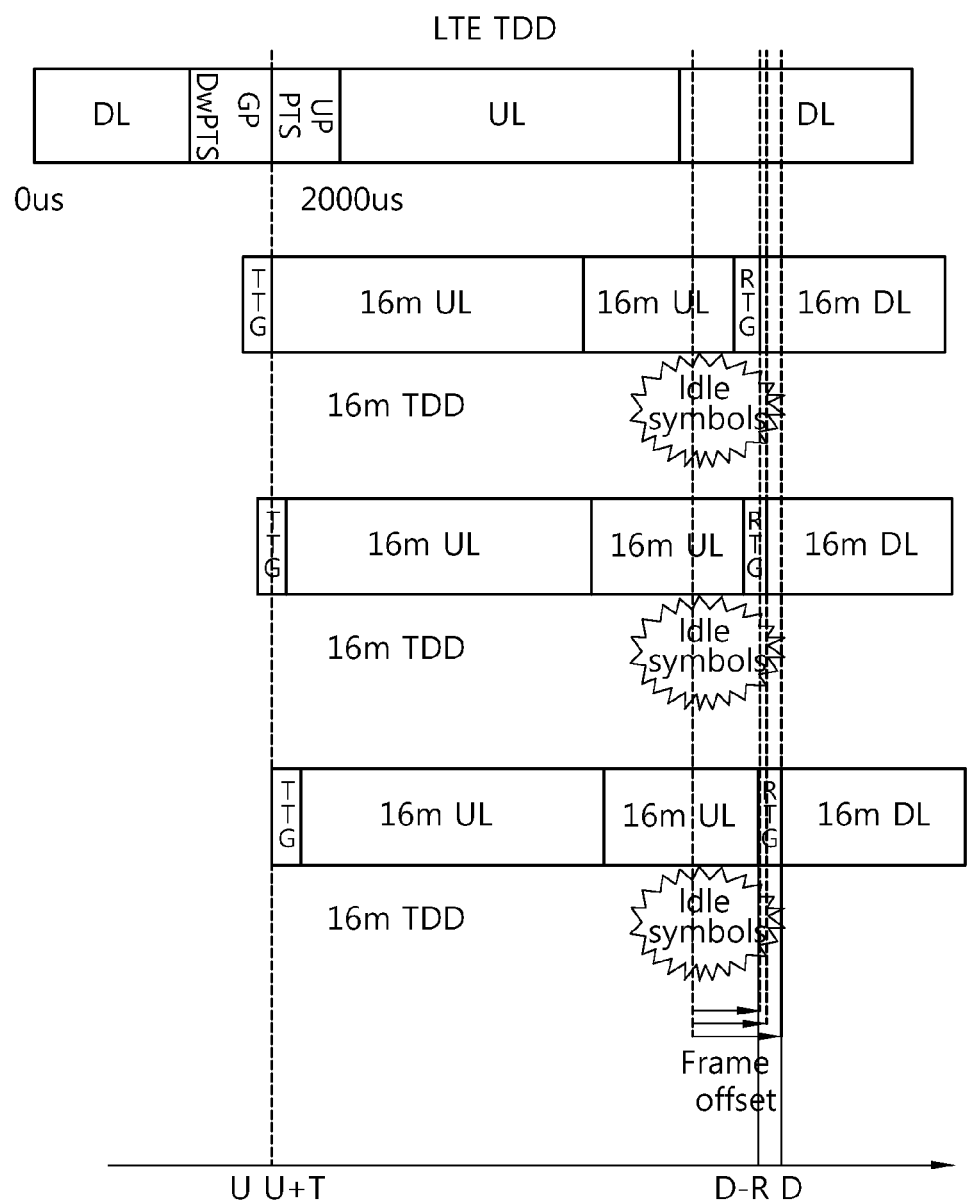
FIG. 15 shows another example of an IEEE 802.16m TDD frame in which an uplink starts on the basis of a UpPTS of an LTE TDD frame.

FIG. 15 shows another example of an IEEE 802.16m TDD frame in which an uplink starts on the basis of a UpPTS of an LTE TDD frame.

Referring to FIG. 15, an uplink of the 802.16m TDD frame may start from any point between a UpPTS start point of the LTE TDD frame and a point G+T obtained by adding a TTG to the UpPTS start point. A DL/UL ratio of the IEEE 802.16m TDD frame is determined based on a DL/UL ratio of the LTE TDD frame, and DL and UL can be distinguished in a subframe unit, Therefore, some OFDMA symbols constituting a UL subframe of the IEEE 802.16m TDD frame may overlap with a downlink of the LTE TDD frame. In this case, to decrease interference between heterogeneous systems, a part overlapping with the downlink of the LTE may be punctured, and UL transmission may not be performed during a punctured idle time duration.

Table 10 to Table 12 show a result when the uplink of the IEEE 802.16m TDD frame starts on the basis of a GP of the LTE TDD frame.

TABLE 10

LTE TDD DL/UL 1:3

| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 214.58 | 714.06 | 71.35 | 3785.41 | 6.14 | 3763.27 | 3868.98 | 6 | 2 | false | false | 0 |
| 1 | 643.23 | 285.42 | 71.35 | 3356.77 | 5.44 | 3146.35 | 3252.06 | 6 | 2 | false | false | 4 |
| 2 | 714.58 | 214.06 | 71.35 | 3285.41 | 5.33 | 3146.35 | 3252.06 | 6 | 2 | false | false | 5 |
| 3 | 785.94 | 142.71 | 71.35 | 3214.06 | 5.21 | 3146.35 | 3252.06 | 5 | 3 | false | false | 0 |
| 4 | 857.29 | 71.35 | 71.35 | 3142.7 | 5.09 | 3146.35 | 3252.06 | 5 | 3 | false | false | 0 |
| 5 | 214.58 | 642.71 | 142.71 | 3785.42 | 6.14 | 3763.27 | 3868.98 | 6 | 2 | false | false | 0 |
| 6 | 643.23 | 214.06 | 142.71 | 3356.77 | 5.44 | 3146.35 | 3252.06 | 6 | 2 | false | false | 4 |
| 7 | 714.58 | 142.71 | 142.71 | 3285.42 | 5.33 | 3146.35 | 3252.06 | 6 | 2 | false | false | 5 |
| 8 | 785.94 | 71.35 | 142.71 | 3214.06 | 5.21 | 3146.35 | 3252.06 | 5 | 3 | false | false | 0 |

TABLE 11

LTE TDD DL/UL 2:2

| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 214.58 | 714.06 | 71.35 | 2785.41 | 4.52 | 2529.43 | 2635.14 | 5 | 3 | false | false | 3 |
| 1 | 643.23 | 285.42 | 71.35 | 2356.77 | 3.82 | 1912.51 | 2018.22 | 4 | 4 | false | false | 2 |
| 2 | 714.58 | 214.06 | 71.35 | 2285.41 | 3.70 | 1912.51 | 2018.22 | 4 | 4 | false | false | 2 |
| 3 | 785.94 | 142.71 | 71.35 | 2214.06 | 3.59 | 1912.51 | 2018.22 | 4 | 4 | false | false | 3 |
| 4 | 857.29 | 71.35 | 71.35 | 2142.7 | 3.47 | 1912.51 | 2018.22 | 4 | 4 | false | false | 4 |
| 5 | 214.58 | 642.71 | 142.71 | 2785.42 | 4.52 | 2529.43 | 2635.14 | 5 | 3 | false | false | 3 |
| 6 | 643.23 | 214.06 | 142.71 | 2356.77 | 3.82 | 1912.51 | 2018.22 | 4 | 4 | false | false | 2 |
| 7 | 714.58 | 142.71 | 142.71 | 2285.42 | 3.70 | 1912.51 | 2018.22 | 4 | 4 | false | false | 2 |
| 8 | 785.94 | 71.35 | 142.71 | 2214.06 | 3.59 | 1912.51 | 2018.22 | 4 | 4 | false | false | 3 |

TABLE 12

LTE TDD DL/UL 3:1

| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 214.58 | 714.06 | 71.35 | 1785.41 | 2.69 | 1295.59 | 1401.3 | 3 | 5 | false | false | 1 |
| 1 | 643.23 | 285.42 | 71.35 | 1356.77 | 2.20 | 1295.59 | 1401.3 | 2 | 6 | false | false | 0 |
| 2 | 714.58 | 214.06 | 71.35 | 1285.41 | 2.08 | 1295.59 | 1401.3 | 2 | 6 | True | false | 0 |
| 3 | 785.94 | 142.71 | 71.35 | 1214.06 | 1.97 | 678.67 | 784.38 | 2 | 6 | false | false | 1 |
| 4 | 857.29 | 71.35 | 71.35 | 1142.7 | 1.85 | 678.67 | 784.38 | 2 | 6 | false | false | 1 |
| 5 | 214.58 | 642.71 | 142.71 | 1785.42 | 2.89 | 1295.59 | 1401.3 | 3 | 5 | false | false | 1 |
| 6 | 643.23 | 214.06 | 142.71 | 1356.77 | 2.20 | 1295.59 | 1401.3 | 2 | 6 | false | false | 0 |
| 7 | 714.58 | 142.71 | 142.71 | 1285.42 | 2.08 | 1295.59 | 1401.3 | 2 | 6 | true | false | 0 |
| 8 | 785.94 | 71.35 | 142.71 | 1214.06 | 1.97 | 678.67 | 784.38 | 2 | | false | false | 1 |

Table 10 shows a DL/UL ratio of the IEEE 802.16m TDD frame according to each special subframe configuration and the number of OFDMA symbols to be punctured, when a DL/UL ratio of the TDD frame is 1:3 and a normal CP is used. Table 11 shows a DL/UL ratio of the IEEE 802.16m TDD frame according to each special subframe configuration and the number of OFDMA symbols to be punctured, when a DL/UL ratio of the TDD frame is 2:2 and a normal CP is used. Table 12 shows a DL/UL ratio of the IEEE 802.16m TDD frame according to each special subframe configuration and the number of OFDMA symbols to be punctured, when a DL/UL ratio of the TDD frame is 3:1 and a normal CP is used.

The DL/UL ratio of the IEEE 802.16m TDD frame is a DL/UL ratio that minimizes the number of OFDMA symbols to be punctured. From Table 10 to Table 12, when the uplink of the IEEE 802.16m frame starts on the basis of the GP of the LTE TDD frame, if a DL part is greater than a UL part, a DL/UL ratio of the IEEE 802.16m TDD frame in which the number of OFDMA symbols is small can be obtained.

Table 13 to Table 15 show a result when the uplink of the IEEE 802.16m TDD frame starts on the basis of a UpPTS of the LTE TDD frame.

TABLE 13

| | | | | UL in LTE with | LTE | 16 m | TTG + | # | # | | | |
| | | | | | UL/16 m | UL + | 16 m UL + | of | of | Use | Use | Puctured |
| | DwPTS | GP | UpPTS | GP + UpPTS | subframe | RTG | RTG | UL | DL | RTG | TTG | symbol |
|---|---|---|---|---|---|---|---|---|---|---|---|---|
| | | | | LTE TDD DL/UL 1:3 | | | | | | | | |
| 0 | 214.58 | 714.06 | 71.35 | 3071.35 | 4.98 | 2529.43 | 2635.14 | 5 | 3 | false | false | 1 |
| 1 | 643.23 | 285.42 | 71.35 | 3071.35 | 4.98 | 2529.43 | 2635.14 | 5 | 3 | false | false | 1 |
| 2 | 714.58 | 214.06 | 71.35 | 3071.35 | 4.98 | 2529.43 | 2635.14 | 5 | 3 | false | false | 1 |
| 3 | 785.94 | 142.71 | 71.35 | 3071.35 | 4.98 | 2529.43 | 2635.14 | 5 | 3 | false | false | 1 |
| 4 | 857.29 | 71.35 | 71.35 | 3071.35 | 4.98 | 2529.43 | 2635.14 | 5 | 3 | false | false | 1 |
| 5 | 214.58 | 642.71 | 142.71 | 3142.71 | 5.09 | 3146.35 | 3252.06 | 5 | 3 | true | false | 0 |
| 6 | 643.23 | 214.06 | 142.71 | 3142.71 | 5.09 | 3146.35 | 3252.06 | 5 | 3 | true | false | 0 |
| 7 | 714.58 | 142.71 | 142.71 | 3142.71 | 5.09 | 3146.35 | 3252.06 | 5 | 3 | true | false | 0 |
| 8 | 785.94 | 71.35 | 142.71 | 3142.71 | 5.09 | 3146.35 | 3252.06 | 5 | 3 | true | false | 0 |

TABLE 14

| | | | | UL in LTE with | LTE | 16 m | TTG + | # | # | | | |
| | | | | | UL/16 m | UL + | 16 m UL + | of | of | Use | Use | Puctured |
| | DwPTS | GP | UpPTS | GP + UpPTS | subframe | RTG | RTG | UL | DL | RTG | TTG | symbol |
|---|---|---|---|---|---|---|---|---|---|---|---|---|
| | | | | LTE TDD DL/UL 2:2 | | | | | | | | |
| 0 | 214.58 | 714.06 | 71.35 | 2071.35 | 3.36 | 1912.51 | 2018.22 | 4 | 4 | false | false | 4 |
| 1 | 643.23 | 285.42 | 71.35 | 2071.35 | 3.36 | 1912.51 | 2018.22 | 4 | 4 | false | false | 4 |
| 2 | 714.58 | 214.06 | 71.35 | 2071.35 | 3.36 | 1912.51 | 2018.22 | 4 | 4 | false | false | 4 |
| 3 | 785.94 | 142.71 | 71.35 | 2071.35 | 3.36 | 1912.51 | 2018.22 | 4 | 4 | false | false | 4 |
| 4 | 857.29 | 71.35 | 71.35 | 2071.35 | 3.36 | 1912.51 | 2018.22 | 4 | 4 | false | false | 4 |
| 5 | 214.58 | 642.71 | 142.71 | 2142.71 | 3.47 | 1912.51 | 2018.22 | 4 | 4 | false | false | 4 |
| 6 | 643.23 | 214.06 | 142.71 | 2142.71 | 3.47 | 1912.51 | 2018.22 | 4 | 4 | false | false | 4 |
| 7 | 714.58 | 142.71 | 142.71 | 2142.71 | 3.47 | 1912.51 | 2018.22 | 4 | 4 | false | false | 4 |
| 8 | 785.94 | 71.35 | 142.71 | 2142.71 | 3.47 | 1912.51 | 2018.22 | 4 | 4 | false | false | 4 |

TABLE 15

| | | | | UL in LTE with | LTE | 16 m | TTG + | # | # | | | |
| | | | | | UL/16 m | UL + | 16 m UL + | of | of | Use | Use | Puctured |
| | DwPTS | GP | UpPTS | GP + UpPTS | subframe | RTG | RTG | UL | DL | RTG | TTG | symbol |
|---|---|---|---|---|---|---|---|---|---|---|---|---|
| | | | | LTE TDD DL/UL 3:1 | | | | | | | | |
| 0 | 214.58 | 714.06 | 71.35 | 1071.35 | 1.74 | 678.67 | 784.38 | 2 | 6 | false | false | 2 |
| 1 | 643.23 | 285.42 | 71.35 | 1071.35 | 1.74 | 678.67 | 784.38 | 2 | 6 | false | false | 2 |
| 2 | 714.58 | 214.06 | 71.35 | 1071.35 | 1.74 | 678.67 | 784.38 | 2 | 6 | false | false | 2 |
| 3 | 785.94 | 142.71 | 71.35 | 1071.35 | 1.74 | 678.67 | 784.38 | 2 | 6 | false | false | 2 |
| 4 | 857.29 | 71.35 | 71.35 | 1071.35 | 1.74 | 678.67 | 784.38 | 2 | 6 | false | false | 2 |
| 5 | 214.58 | 642.71 | 142.71 | 1142.71 | 1.85 | 678.67 | 784.38 | 2 | 6 | false | false | 1 |
| 6 | 643.23 | 214.06 | 142.71 | 1142.71 | 1.85 | 678.67 | 784.38 | 2 | 6 | false | false | 1 |
| 7 | 714.58 | 142.71 | 142.71 | 1142.71 | 1.85 | 678.67 | 784.38 | 2 | 6 | false | false | 1 |
| 8 | 785.94 | 71.35 | 142.71 | 1142.71 | 1.85 | 678.67 | 784.38 | 2 | 6 | false | false | 1 |

Table 13 shows a DL/UL ratio of the IEEE 802.16m TDD frame according to each special subframe configuration and the number of OFDMA symbols to be punctured, when a DL/UL ratio of the TDD frame is 1:3 and a normal CP is used. Table 14 shows a DL/UL ratio of the IEEE 802.16m TDD frame according to each special subframe configuration and the number of OFDMA symbols to be punctured, when a DL/UL ratio of the TDD frame is 2:2 and a normal CP is used. Table 15 shows a DL/UL ratio of the IEEE 802.16m TDD frame according to each special subframe configuration and the number of OFDMA symbols to be punctured, when a DL/UL ratio of the TDD frame is 3:1 and a normal CP is used.

The DL/UL ratio of the IEEE 802.16m TDD frame is a DL/UL ratio that minimizes the number of OFDMA symbols to be punctured. From Table 13 to Table 15, if the uplink of the IEEE 802.16m frame starts on the basis of the UpPTS of the LTE TDD frame, when a UL part is greater than a DL part, a DL/UL ratio of the IEEE 802.16m TDD frame in which the number of OFDMA symbols is small can be obtained.

Referring to Table 10 to Table 15, when a usage amount of downlink is great, the IEEE 802.16m TDD frame can be configured such that the uplink starts on the basis of the GP of the LTE TDD frame, and when a usage amount of uplink is great, the IEEE 802.16m TDD frame can be configured such that the uplink can start on the basis of the UpPTS of the LTE TDD frame. The same can also apply to a case where the LTE TDD frame has an extended CP.

Table 16 shows an LTE TDD frame having an extended CP and a DL/UL ratio of 1:3 and an IEEE 802.16m TDD frame structure having coexistence with the LTE TDD frame.

TABLE 16

| configuration | Switch point periodicity | 0 | 1 | | | 2 | 3 | 4 | 5 | 6 | | | 7 | 8 | 9 |
|---|---|---|---|---|---|---|---|---|---|---|---|---|---|---|---|
| 0 (DL/UL 1:3) | | D | S | | | U | U | U | D | S | | | U | U | U |
| | 5 ms | D | DwPTS | GP | UpPTS | U | U | U | D | DwPTS | GP | UpPTS | U | U | U |
| Normal | | | 250.00 | 666.67 | 83.33 | | | | | 250.00 | 666.67 | 83.33 | | | |
| CP, | | | 666.67 | 250.00 | 83.33 | | | | | 666.67 | 250.00 | 83.33 | | | |
| Switch | | | 750.00 | 166.67 | 83.33 | | | | | 750.00 | 166.67 | 83.33 | | | |
| point | | | 833.33 | 83.33 | 83.33 | | | | | 833.33 | 83.33 | 83.33 | | | |
| | | | 250.00 | 583.33 | 166.67 | | | | | 250.00 | 583.33 | 166.67 | | | |
| | | | 666.67 | 166.67 | 166.67 | | | | | 666.67 | 166.67 | 166.67 | | | |
| | | | 750.00 | 83.33 | 166.67 | | | | | 750.00 | 83.33 | 166.67 | | | |
| 16 m(1) | | | | | U | | | | | | | U | | | |
| 16 m(2) | | | | | | U | | | | | | | U | | |

Table 17 shows an LTE TDD frame having an extended CP and a DL/UL ratio of 2:2 and an IEEE 802.16m TDD frame structure having coexistence with the LTE TDD frame.

TABLE 17

| configuration | Switch point periodicity | 0 | 1 | | | 2 | 3 | 4 | 5 | 6 | | | 7 | 8 | 9 |
|---|---|---|---|---|---|---|---|---|---|---|---|---|---|---|---|
| 1 (DL/UL 2:2) | | D | S | | | U | U | D | D | S | | | U | U | D |
| | 5 ms | D | DwPTS | GP | UpPTS | U | U | D | D | DwPTS | GP | UpPTS | U | U | D |
| Normal | | | 250.00 | 666.67 | 83.33 | | | | | 250.00 | 666.67 | 83.33 | | | |
| CP, | | | 666.67 | 250.00 | 83.33 | | | | | 666.67 | 250.00 | 83.33 | | | |
| Switch | | | 750.00 | 166.67 | 83.33 | | | | | 750.00 | 166.67 | 83.33 | | | |
| point | | | 833.33 | 83.33 | 83.33 | | | | | 833.33 | 83.33 | 83.33 | | | |
| | | | 250.00 | 583.33 | 166.67 | | | | | 250.00 | 583.33 | 166.67 | | | |
| | | | 666.67 | 166.67 | 166.67 | | | | | 666.67 | 166.67 | 166.67 | | | |
| | | | 750.00 | 83.33 | 166.67 | | | | | 750.00 | 83.33 | 166.67 | | | |
| 16 m(l) | | | | | U | | | | | | | U | | | |
| 16 m(2) | | | | | | U | | | | | | | U | | |

Table 18 shows an LTE TDD frame having an extended CP and a DL/UL ratio of 3:1 and an IEEE 802.16m TDD frame structure having coexistence with the LTE TDD frame.

TABLE 18

| configuration | Switch point periodicity | 0 | 1 | | | 2 | 3 | 4 | 5 | 6 | | | 7 | 8 | 9 |
|---|---|---|---|---|---|---|---|---|---|---|---|---|---|---|---|
| 2 (DL/UL 3:1) | | D | S | | | U | D | D | D | S | | | U | D | D |
| | 5 ms | D | DwPTS | GP | UpPTS | U | D | D | D | DwPTS | GP | UpPTS | U | D | D |
| Normal | | | 250.00 | 666.67 | 83.33 | | | | | 250.00 | 666.67 | 83.33 | | | |
| CP, | | | 666.67 | 250.00 | 83.33 | | | | | 666.67 | 250.00 | 83.33 | | | |
| Switch | | | 750.00 | 166.67 | 83.33 | | | | | 750.00 | 166.67 | 83.33 | | | |
| point | | | 833.33 | 83.33 | 83.33 | | | | | 833.33 | 83.33 | 83.33 | | | |
| | | | 250.00 | 583.33 | 166.67 | | | | | 250.00 | 583.33 | 166.67 | | | |

TABLE 18-continued

| Switch point configuration | periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| | | | 666.67 | | | | | 666.67 | 166.67 | 166.67 | |
| | | | 166.67 | | | | | 166.67 | | | |
| | | | 750.00 | 83.33 | 166.67 | | | 750.00 | 83.33 | 166.67 | |
| 16 m(1) | | | U | | | | | | U | | |
| 16 m(2) | | | | U | | | | | | U | |

Referring to Table 16 to Table 18, the DL/UL ratio of the LTE TDD frame may be 1:3, 2:2, or 3:1. To decrease interference between heterogeneous systems, an uplink of the IEEE 802.16m TDD frame may start on the basis of a GP or a UpPTS of the LCR TDD frame. That is, when the DL/UL ratio of the LCR TDD frame is 1:3, a maximum uplink length of the uplink of the IEEE 802.16m TDD frame is GP+UpPTS+U+U+U, and if it starts on the basis of a UpPTS, the maximum uplink length is UpPTS+U+U+U. When the DL/UL ratio of the LTE TDD frame is 5:2, if the uplink of the IEEE 802.16m TDD frame starts on the basis of the GP of the LTE TDD frame, a maximum possible uplink length of the IEEE 802.16m TDD frame is GP+UpPTS+U+U, and if it starts on the basis of the UpPTS, the maximum possible uplink length is UpPTS+U+U. When the DL/UL ratio of the LTE TDD frame is 3:1, if the uplink of the IEEE 802.16m TDD frame starts on the basis of the GP of the LTE TDD frame, a maximum possible uplink length of the IEEE 802.16m TDD frame is GP+UpPTS+U, and the maximum possible uplink length is UpPTS+U if it starts on the basis of the UpPTS.

Therefore, the DL/UL ratio of the IEEE 802.16m TDD frame having coexistence with the LTE TDD frame can be determined based on the DL/UL ratio of the LTE TDD frame and a start point of the uplink of the IEEE 802.16m TDD frame.

Table 19 to Table 21 show a result when the uplink of the IEEE 802.16m TDD frame starts on the basis of the GP of the LTE TDD frame.

TABLE 19

| | | | | | LTE TDD DL/UL 1:3 | | | | | | |
|---|---|---|---|---|---|---|---|---|---|---|---|
| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
| 0 | 250.00 | 666.67 | 83.33 | 3750 | 6.08 | 3763.27 | 3868.98 | 6 | 2 | True | false | 0 |
| 1 | 666.67 | 250.00 | 83.33 | 3333.33 | 5.40 | 3146.35 | 3252.06 | 6 | 2 | false | false | 4 |
| 2 | 750.00 | 166.67 | 83.33 | 3250 | 5.27 | 3146.35 | 3252.06 | 5 | 3 | false | True | 0 |
| 3 | 833.33 | 83.33 | 83.33 | 3166.67 | 5.13 | 3146.35 | 3252.06 | 5 | 3 | false | True | 0 |
| 4 | 250.00 | 583.33 | 166.67 | 3750 | 6.08 | 3763.27 | 3868.98 | 6 | 2 | true | false | 0 |
| 5 | 666.67 | 166.67 | 166.67 | 3333.33 | 5.40 | 3146.35 | 3252.06 | 6 | 2 | false | false | 4 |
| 6 | 750.00 | 83.33 | 166.67 | 3250 | 5.27 | 3146.35 | 3252.06 | 5 | 3 | false | True | 0 |

TABLE 20

| | | | | | LTE TDD DL/UL 2:2 | | | | | | |
|---|---|---|---|---|---|---|---|---|---|---|---|
| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
| 0 | 250.00 | 666.67 | 83.33 | 2750 | 4.46 | 2529.43 | 2635.14 | 5 | 3 | false | false | 4 |
| 1 | 666.67 | 250.00 | 83.33 | 2333.33 | 3.78 | 1912.51 | 2018.22 | 4 | 4 | false | false | 2 |
| 2 | 750.00 | 166.67 | 83.33 | 2250 | 3.65 | 1912.51 | 2018.22 | 4 | 4 | false | false | 3 |
| 3 | 833.33 | 83.33 | 83.33 | 2166.67 | 3.51 | 1912.51 | 2018.22 | 4 | 4 | false | false | 3 |
| 4 | 250.00 | 583.33 | 166.67 | 2750 | 4.46 | 2529.43 | 2635.14 | 5 | 3 | false | false | 4 |
| 5 | 666.67 | 166.67 | 166.67 | 2333.33 | 3.78 | 1912.51 | 2018.22 | 4 | 4 | false | false | 2 |
| 6 | 750.00 | 83.33 | 166.67 | 2250 | 3.65 | 1912.51 | 2018.22 | 4 | 4 | false | false | 3 |

TABLE 21

LTE TDD DL/UL 3:1

|   | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 250.00 | 666.67 | 83.33 | 1750 | 2.84 | 1295.59 | 1401.3 | 3 | 5 | false | false | 1 |
| 1 | 666.67 | 250.00 | 83.33 | 1333.33 | 2.16 | 1295.59 | 1401.3 | 2 | 6 | false | True | 0 |
| 2 | 750.00 | 166.67 | 83.33 | 1250 | 2.03 | 1295.59 | 1401.3 | 2 | 6 | true | false | 0 |
| 3 | 833.33 | 83.33 | 83.33 | 1166.67 | 1.89 | 1295.59 | 1401.3 | 2 | 6 | false | false | 1 |
| 4 | 250.00 | 583.33 | 166.67 | 1750 | 2.84 | 1295.59 | 1401.3 | 3 | 5 | false | False | 1 |
| 5 | 666.67 | 166.67 | 166.67 | 1333.33 | 2.16 | 1295.59 | 1401.3 | 2 | 6 | false | True | 0 |
| 6 | 750.00 | 83.33 | 166.67 | 1250 | 2.03 | 1295.59 | 1401.3 | 2 | 6 | true | false | 0 |

Table 19 shows a DL/UL ratio of the IEEE 802.16m TDD frame according to each special subframe configuration and the number of OFDMA symbols to be punctured, when a DL/UL ratio of the LTE TDD frame is 1:3 and an extended CP is used. Table 20 shows a DL/UL ratio of the IEEE 802.16m TDD frame according to each special subframe configuration and the number of OFDMA symbols to be punctured, when a DL/UL ratio of the TDD frame is 2:2 and an extended CP is used. Table 21 shows a DL/UL ratio of the IEEE 802.16m TDD frame according to each special subframe configuration and the number of OFDMA symbols to be punctured, when a DL/UL ratio of the TDD frame is 3:1 and an extended CP is used.

The DL/UL ratio of the IEEE 802.16m TDD frame is a DL/UL ratio that minimizes the number of OFDMA symbols to be punctured. From Table 19 to Table 21, if the uplink of the IEEE 802.16m frame starts on the basis of the GP of the LTE TDD frame, when a DL part is greater than a UL part, a DL/UL ratio of the IEEE 802.16m TDD frame in which the number of OFDMA symbols is small can be obtained.

Table 22 to Table 24 show a result when the uplink of the IEEE 802.16m TDD frame starts on the basis of the UpPTS of the LTE TDD frame.

TABLE 22

LTE TDD DL/UL 1:3

|   | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 250.00 | 666.67 | 83.33 | 3083.33 | 5.00 | 2529.43 | 2635.14 | 5 | 3 | false | false | 1 |
| 1 | 666.67 | 250.00 | 83.33 | 3083.33 | 5.00 | 2529.43 | 2635.14 | 5 | 3 | false | false | 1 |
| 2 | 750.00 | 166.67 | 83.33 | 3083.33 | 5.00 | 2529.43 | 2635.14 | 5 | 3 | false | false | 1 |
| 3 | 833.33 | 83.33 | 83.33 | 3083.33 | 5.00 | 2529.43 | 2635.14 | 5 | 3 | false | false | 1 |
| 4 | 250.00 | 583.33 | 166.67 | 3166.67 | 5.13 | 3416.35 | 3252.06 | 5 | 3 | false | true | 0 |
| 5 | 666.67 | 166.67 | 166.67 | 3166.67 | 5.13 | 3416.35 | 3252.06 | 5 | 3 | false | true | 0 |
| 6 | 750.00 | 83.33 | 166.67 | 3166.67 | 5.13 | 3416.35 | 3252.06 | 5 | 3 | false | true | 0 |

TABLE 23

LTE TDD DL/UL 2:2

|   | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
|---|---|---|---|---|---|---|---|---|---|---|---|---|
| 0 | 250.00 | 666.67 | 83.33 | 2083.33 | 3.38 | 1912.51 | 2018.22 | 4 | 4 | false | false | 4 |
| 1 | 666.67 | 250.00 | 83.33 | 2083.33 | 3.38 | 1912.51 | 2018.22 | 4 | 4 | false | false | 4 |
| 2 | 750.00 | 166.67 | 83.33 | 2083.33 | 3.38 | 1912.51 | 2018.22 | 4 | 4 | false | false | 4 |
| 3 | 833.33 | 83.33 | 83.33 | 2083.33 | 3.38 | 1912.51 | 2018.22 | 4 | 4 | false | false | 4 |
| 4 | 250.00 | 583.33 | 166.67 | 2166.67 | 3.51 | 1912.51 | 2018.22 | 4 | 4 | false | false | 3 |
| 5 | 666.67 | 166.67 | 166.67 | 2166.67 | 3.51 | 1912.51 | 2018.22 | 4 | 4 | false | false | 3 |
| 6 | 750.00 | 83.33 | 166.67 | 2166.67 | 3.51 | 1912.51 | 2018.22 | 4 | 4 | false | false | 3 |

TABLE 24

| | | | | | | | | | | | | |
|---|---|---|---|---|---|---|---|---|---|---|---|---|
| | | | | | LTE TDD DL/UL 3:1 | | | | | | | |
| | DwPTS | GP | UpPTS | UL in LTE with GP + UpPTS | LTE UL/16 m subframe | 16 m UL + RTG | TTG + 16 m UL + RTG | # of UL | # of DL | Use RTG | Use TTG | Puctured symbol |
| 0 | 250.00 | 666.67 | 83.33 | 1083.33 | 1.76 | 678.67 | 784.38 | 2 | 6 | false | false | 2 |
| 1 | 666.67 | 250.00 | 83.33 | 1083.33 | 1.76 | 678.67 | 784.38 | 2 | 6 | false | false | 2 |
| 2 | 750.00 | 166.67 | 83.33 | 1083.33 | 1.76 | 678.67 | 784.38 | 2 | 6 | false | false | 2 |
| 3 | 833.33 | 83.33 | 83.33 | 1083.33 | 1.76 | 678.67 | 784.38 | 2 | 6 | false | false | 2 |
| 4 | 250.00 | 583.33 | 166.67 | 1166.67 | 1.89 | 678.67 | 784.38 | 2 | 6 | false | false | 1 |
| 5 | 666.67 | 166.67 | 166.67 | 1166.67 | 1.89 | 678.67 | 784.38 | 2 | 6 | false | false | 1 |
| 6 | 750.00 | 83.33 | 166.67 | 1166.67 | 1.89 | 678.67 | 784.38 | 2 | 6 | false | false | 1 |

Table 22 shows a DL/UL ratio of the IEEE 802.16m TDD frame according to each special subframe configuration and the number of OFDMA symbols to be punctured, when a DL/UL ratio of the TDD frame is 1:3 and an extended CP is used. Table 23 shows a DL/UL ratio of the IEEE 802.16m TDD frame according to each special subframe configuration and the number of OFDMA symbols to be punctured, when a DL/UL ratio of the TDD frame is 2:2 and an extended CP is used. Table 24 shows a DL/UL ratio of the IEEE 802.16m TDD frame according to each special subframe configuration and the number of OFDMA symbols to be punctured, when a DL/UL ratio of the TDD frame is 3:1 and an extended CP is used.

The DL/UL ratio of the IEEE 802.16m TDD frame is a DL/UL ratio that minimizes the number of OFDMA symbols to be punctured. From Table 22 to Table 24, if the uplink of the IEEE 802.16m frame starts on the basis of the UpPTS of the LTE TDD frame, when a UL part is greater than a DL part, a DL/UL ratio of the IEEE 802.16m TDD frame in which the number of OFDMA symbols is small can be obtained.

Referring to Table 19 to Table 24, when a usage amount of downlink is great, the IEEE 802.16m TDD frame can be configured such that the uplink starts on the basis of the GP of the LTE TDD frame, and when a usage amount of uplink is great, the IEEE 802.16m TDD frame can be configured such that the uplink can start on the basis of the UpPTS of the LTE TDD frame.

To configure the aforementioned TDD frame, a BS may know information on a frame offset and transmit information regarding a punctured OFDMA symbol to a UE. The frame offset denotes a duration between a DL start time of a heterogeneous TDD frame (e.g., an LCR TDD frame or an LTE TDD frame) and a DL start point of the IEEE 802.16m TDD frame, and may be expressed by the number of OFDMA symbols or a unit of µs. A punctured OFDMA symbol is a UL region of the IEEE 802.16m TDD frame overlapping with a downlink of the heterogeneous TDD frame, and is an idle time. Information on the punctured OFDMA symbol may include a location of the punctured OFDMA and the number of the punctured OFDMA symbols. The BS and the UE can match DL/UL alignment by using the frame offset and the number of punctured OFDMA symbols, and can decrease inter-system interference.

Figure 16:
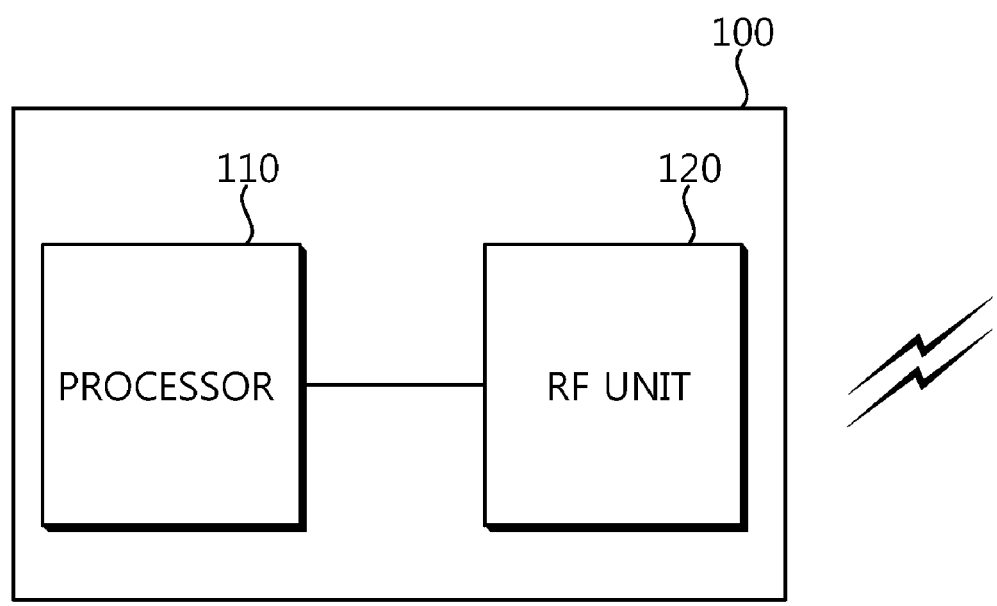
FIG. 16 is a block diagram showing a structure of a UE for implementing a communication method according to an embodiment of the present invention.

FIG. 16 is a block diagram showing a structure of a UE for implementing a communication method according to an embodiment of the present invention.

Referring to FIG. 16, a UE 100 includes a processor 110 and a radio frequency (RF) unit 120. The RF unit 120 of the UE 100 is connected to the processor 110, and transmits a radio signal. The processor 110 of the UE 100 includes at least one DL subframe and at least one UL subframe, configures a TDD frame in which an uplink starts on the basis of a guard period (GP) or an uplink pilot time slot (UpPTS) of a heterogeneous TDD frame, and transmits a signal by using the TDD frame. The processor 100 implements the method of the present invention.

According to the present invention, a time division duplexing (TDD) frame structure capable of decreasing interference between heterogeneous systems can be provided. In particular, coexistence between a system based on an institute of electrical and electronics engineers (IEEE) 802.16m standard and a system based on an low chip rate (LCR) standard or a long term evolution (LTE) standard can be guaranteed.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A communication method of a user equipment using a time division duplex (TDD) frame in a wireless communication system, the method comprising:
   configuring a TDD frame for a first system, the TDD frame comprising at least one downlink subframe and at least one uplink subframe; and
   transmitting a signal by using the TDD frame,
   wherein an uplink of the TDD frame starts on the basis of a guard period (GP) or an uplink pilot time slot (UpPTS) of a heterogeneous TDD frame for second for a second system, and
   wherein a ratio of a number of the at least one downlink subframe in TDD frame and a number of the at least one uplink subframe in the TDD frame is determined based on a ratio of a number of downlink subframes in the heterogeneous TDD frame and a number of uplink subframes in the heterogeneous TDD frame and a point where the uplink of the TDD frame starts.

2. The method of claim 1, wherein, when a downlink part is greater than an uplink part, the uplink of the TDD frame starts on the basis of the GP, and when the uplink part is greater than the downlink part, the uplink of the TDD frame starts on the basis of the UpPTS.

3. The method of claim 1, wherein the first system is an institute of electrical and electronics engineers (IEEE) 802.16 m system.

4. The method of claim 1, wherein an uplink orthogonal frequency division multiplexing access (OFDMA) symbol of the TDD frame overlapping with a downlink of the heterogeneous TDD frame is punctured.

5. The method of claim 4, further comprising receiving information on the OFDMA symbols to be punctured.

6. The method of claim 1, wherein the heterogeneous TDD frame is a TDD frame based on a low chip rate (LCR) standard or a TDD frame based on a long term evolution (LTE) standard.

* * * * *